US012791175B2

(12) United States Patent
Doughty et al.

(10) Patent No.: US 12,791,175 B2
(45) Date of Patent: Nov. 10, 2026

(54) LIGHT-EMITTING SYSTEMS

(71) Applicant: ILLUMAGEAR, INC., Seattle, WA (US)

(72) Inventors: Chris Doughty, Seattle, WA (US); John Maxwell Baker, Seattle, WA (US); Jedediah Joaquin McCann, Portland, OR (US); Joshua Robert Buesseler, Seattle, WA (US)

(73) Assignee: ILLUMAGEAR, INC., Seattle, WA (US)

( * ) Notice: Subject to any disclaimer, the term of this patent is extended or adjusted under 35 U.S.C. 154(b) by 0 days.

(21) Appl. No.: 19/284,509

(22) Filed: Jul. 29, 2025

(65) Prior Publication Data

US 2026/0022824 A1 Jan. 22, 2026

Related U.S. Application Data

(63) Continuation of application No. 18/929,354, filed on Oct. 28, 2024, now Pat. No. 12,398,868, which is a
(Continued)

(51) Int. Cl.
*F21V 21/084* (2006.01)
*A42B 3/04* (2006.01)
(Continued)

(52) U.S. Cl.
CPC ............ *F21V 21/084* (2013.01); *A42B 3/044* (2013.01); *A42B 3/0446* (2013.01); *A42B 3/30* (2013.01);
(Continued)

(58) Field of Classification Search
CPC .. F21V 21/084; F21V 23/045; F21V 23/0492; F21V 33/0064; H05B 47/19;
(Continued)

(56) References Cited

U.S. PATENT DOCUMENTS 5,408,393 A 4/1995 Becker
8,529,082 B1 9/2013 Baker et al.
(Continued)

FOREIGN PATENT DOCUMENTS

KR 20190012489 A 2/2019
KR 20190035239 A 4/2019
(Continued)

OTHER PUBLICATIONS

U.S. Appl. No. 18/929,354, filed Oct. 28, 2024.
(Continued)

*Primary Examiner* — Bao Q Truong

(74) *Attorney, Agent, or Firm* — Seed Intellectual Property Law Group LLP

(57) ABSTRACT

A light-emitting system (1000) removably attachable to headgear is provided, which comprises: a form factor (1010) configured to surround a portion of the headgear when the light-emitting system (1000) is removably attached to the headgear for use; a plurality of halo lighting elements (1100) configured to selectively generate at least a partial halo of light that radiates outwardly away from the light-emitting system; and at least one task lighting element (1120) aligned in a direction along a task light axis (1130) that is fixed and oriented downwardly at an oblique angle (α) relative to a transverse plane (TP) of the light-emitting system (1000), the at least one task lighting element (1120) being configured to selectively generate flood task lighting in an area in front of a user.

19 Claims, 17 Drawing Sheets

Related U.S. Application Data continuation of application No. 18/069,860, filed on Dec. 21, 2022, now Pat. No. 12,163,647, which is a continuation of application No. 17/282,724, filed as application No. PCT/US2020/060584 on Nov. 13, 2020, now Pat. No. 11,561,001.

(60) Provisional application No. 62/935,555, filed on Nov. 14, 2019.

(51) Int. Cl.

| | |
|---|---|
| ***A42B 3/30*** | (2006.01) |
| ***F21L 4/02*** | (2006.01) |
| ***F21V 23/04*** | (2006.01) |
| ***F21V 33/00*** | (2006.01) |
| ***H05B 47/175*** | (2020.01) |
| ***H05B 47/19*** | (2020.01) |
| *F21Y 103/30* | (2016.01) |
| *F21Y 113/20* | (2016.01) |
| *F21Y 115/10* | (2016.01) |

(52) U.S. Cl.

CPC .............. *F21L 4/02* (2013.01); *F21V 23/045* (2013.01); *F21V 23/0492* (2013.01); *F21V 33/0064* (2013.01); *H05B 47/19* (2020.01); *H05B 47/196* (2024.01); *F21Y 2103/30* (2016.08); *F21Y 2113/20* (2016.08); *F21Y 2115/10* (2016.08)

(58) Field of Classification Search

CPC ..... H05B 47/196; A42B 3/044; A42B 3/0446; A42B 3/30; F21L 4/02; F21Y 2103/30; F21Y 2113/20; F21Y 2115/10

See application file for complete search history.

(56) References Cited

U.S. PATENT DOCUMENTS

| | | | | |
|---|---|---|---|---|
| 9,323,325 | B2 | 4/2016 | Perez et al. | |
| 9,829,182 | B1 * | 11/2017 | McCaslin ................. | F21L 2/00 |
| 10,383,384 | B2 | 8/2019 | Zhavoronkov et al. | |
| 11,561,001 | B2 | 1/2023 | Doughty et al. | |
| 12,163,647 | B2 | 12/2024 | Doughty et al. | |
| 12,398,868 | B2 | 8/2025 | Doughty et al. | |
| 2012/0062571 | A1 | 3/2012 | Malek | |
| 2013/0223070 | A1 * | 8/2013 | Baker ................. | F21V 33/0076 362/244 |
| 2014/0173807 | A1 | 6/2014 | Waters | |
| 2015/0250245 | A1 | 9/2015 | Waters | |
| 2018/0177258 | A1 | 6/2018 | Ye et al. | |
| 2019/0037954 | A1 | 2/2019 | Friedman et al. | |
| 2019/0156642 | A1 | 5/2019 | Royal et al. | |
| 2020/0248896 | A1 | 8/2020 | Gall et al. | |
| 2021/0153589 | A1 | 5/2021 | Wroblewski Rodriguez et al. | |

FOREIGN PATENT DOCUMENTS

| | | | |
|---|---|---|---|
| WO | 2012006653 | A1 | 1/2012 |
| WO | 2017055804 | A1 | 4/2017 |
| WO | 2020072825 | A1 | 4/2020 |

OTHER PUBLICATIONS

U.S. Appl. No. 18/069,860, filed Dec. 21, 2022.

U.S. Appl. No. 17/282,724, filed Apr. 2, 2021.

International Search Report and Written Opinion mailed Mar. 12, 2021, in International Application No. PCT/US2020/060584, 11 pages.

* cited by examiner

LIGHT-EMITTING SYSTEMS

CROSS-REFERENCE TO RELATED APPLICATIONS

This application is a continuation of U.S. patent application Ser. No. 18/929,354, filed Oct. 28, 2024, which is a continuation of U.S. patent application Ser. No. 18/069,860, filed Dec. 21, 2022, now U.S. Pat. No. 12,163,647, which is a continuation of U.S. patent application Ser. No. 17/282,724, filed Apr. 2, 2021, now U.S. Pat. No. 11,561,001, which is a 371 of International Application No. PCT/US2020/060584, filed Nov. 13, 2020, which claims the benefit of U.S. Provisional Application No. 62/935,555, filed Nov. 14, 2019, the entire contents of which are herein incorporated by reference.

TECHNICAL FIELD

This disclosure generally relates to light-emitting systems and devices to illuminate people at risk to enhance their visibility to others, such as, for example, systems and devices to illuminate workers in construction, mining, and emergency response fields such that they are particularly noticeable.

The disclosure also relates generally to techniques for facilitating the tracking and improved visibility of industry workers and other users, as well as for dynamically providing alerts and visual identifications associated with particular aspects of those workers and users.

BACKGROUND

Various light-emitting systems and devices are used in construction, mining, and emergency response fields, among others, to illuminate a work area or otherwise provide a source of light to complete tasks under low or poor lighting conditions. For example, industrial floodlight towers are often used in the construction industry to illuminate a work environment. In addition, headlamps of various configurations are often worn by construction workers to provide a source of light to facilitate certain tasks. Such devices, however, suffer from a variety of drawbacks. For example, light emitted from floodlight towers is often blocked by various objects causing regions of darkness where enhanced lighting may be desired. As another example, conventional headlamps often provide a focused beam of light that provides inadequate lighting in areas beyond a user's immediate field of view.

In addition, various personal protective gear exists for enhancing user safety, such as, for example, reflective vests that are intended to increase visibility of the wearer. Such reflective gear, however, also suffers from a variety of drawbacks. For example, it provides a passive system relying on external sources of light to illuminate reflective portions thereof and provides only limited personal illumination in terms of intensity and scope.

Moreover, worksites in various industries (e.g., construction, transportation, transit, medical, etc.) involve workers or other users utilizing equipment, vehicles, and materials in circumstances that may prove difficult, dangerous, unpredictable, and in close proximity to vulnerable worksite personnel. Improved visibility for and of such workers may be advantageous, but complicated by circumstances innate to the worksite (such as workers with disparate roles and experience levels wearing similar or identical uniforms and/or safety equipment) and by environmental factors (e.g., weather, time of day, lowlight conditions, etc.). Moreover, managers of such worksites may find it difficult to accurately track the location and role of particular workers, both historically and in real-time. Existing techniques for tracking and improving the visibility of such workers (e.g., reflective gear or other passive solutions) have various problems.

BRIEF SUMMARY

Embodiments described herein provide light-emitting systems for headgear that are particularly well adapted to illuminate people at risk, such as, for example, workers in the construction industry, mining industry and other hazardous or hostile environments. The light-emitting systems provide enhanced illumination around the user to enable the completion of tasks that may otherwise be difficult to carry out under low or poor lighting conditions. In some embodiments, the light-emitting systems provide a continuous or substantially continuous ring or halo of light around a user's head that can be seen from an extended distance (e.g., up to and exceeding a one-quarter mile) and from a particularly wide range of directions, such as, for example, from an overhead direction. The light-emitting systems may also simultaneously provide substantial illumination within and outside the user's immediate field of view to illuminate areas within the user's general workspace, including areas in the user's peripheral view, as well as work areas of nearby co-workers.

In one embodiment, a light-emitting system (1000) removably attachable to headgear may be summarized as including: a form factor (1010) configured to surround a portion of the headgear when the light-emitting system (1000) is removably attached to the headgear for use; a plurality of halo lighting elements (1100) configured to selectively generate at least a partial halo of light that radiates outwardly away from the light-emitting system; and at least one task lighting element (1120) aligned in a direction along a task light axis (1130) that is fixed and oriented downwardly at an oblique angle ($\alpha$) relative to a transverse plane (TP) of the light-emitting system (1000), the at least one task lighting element (1120) being configured to selectively generate flood task lighting in an area in front of a user.

The form factor may comprise a housing (1020) with at least one lens (1060). The at least one lens (1060) of the housing (1020) may include a downwardly extending projection (1220) to overlie the at least one task lighting element (1120). At least some of the plurality of halo lighting elements (1100) may be supported by the housing (1020) and fixed in a stationary manner relative to the housing (1020) and the at least one task lighting element (1120). The light-emitting system (1000) may comprise a pair of task lighting elements (1120), each one of the pair of task lighting elements (1120) being provided on a respective one of opposing lateral sides of a sagittal plane (SP) of the light-emitting system (1000). At least one spot lighting element (1140) may be supported between the pair of task lighting elements (1120) and being configured to selectively generate spot lighting in the area in front of the user. The at least one spot lighting element (1140) may be aligned in a direction along a spot light axis (1150), and each of the pair of task lighting elements (1120) may be aligned along a respective task light axis (1120), and the spot light axis (1150) may be non-parallel to the task lighting axes (1130). The spot light axis (1150) may be oriented generally parallel with the transverse plane (TP) of the light-emitting system (1000), and each task light axis (1130) may be oriented downwardly at an oblique angle (α) relative to the transverse plane (TP). For example, each task light axis (1130) may oriented downwardly at an oblique angle (α) of at least 20 degrees relative to the transverse plane (TP), or between 20 degrees and 60 degrees. The at least one lens (1060) may include a pair of downwardly extending projections (1220) to overlie the pair of task lighting elements (1120). The downwardly extending projections (1220) may extend at an oblique angle (β) relative to the transverse plane (TP) of the light-emitting system (1000) toward a central axis (A) of the light-emitting system (1000). At least some of the plurality of halo lighting elements (1100) may be supported in an anterior region of the light-emitting system between the pair of task lighting elements (1120). The at least one lens (1060) may have a base portion (1200) that overlies at least some of the plurality of halo lighting elements (1100), and the downwardly extending projections (1220) may extend from the base portion (1200) in the anterior region of the light-emitting system (1000). The housing (1020) of the light-emitting system (1000) may comprise a singular, at least partially annular lens (1060) that overlies at least some of the plurality of halo lighting elements (1100) and the pair of task lighting elements (1120).

The light-emitting system may further include an attachment mechanism (1040) attached to the housing (1020) for removably securing the light-emitting system (1000) to the headgear without compromising the integrity of the headwear.

The at least one task lighting element (1120) may be selectively illuminable independently of the plurality of halo lighting elements (1100). When provided, the at least one spot lighting element (1140) may be selectively illuminable independently of the at least one task lighting element (1120) and the plurality of halo lighting elements (1100). The light-emitting system may further include a first touch control element (1300) associated with the plurality of halo lighting elements (1100) for controlling an illumination state of the halo lighting elements (1100), and a second touch control element (1320) associated with the at least one spot lighting element (1140) and the at least one task lighting element (1120) for controlling illumination states of the at least one spot lighting element (1140) and the at least one task lighting element (1160). A luminous flux of the at least one spot lighting element (1140) may be greater than a luminous flux of the at least one task lighting element (1160). A beam angle of the at least one spot lighting element (1140) may be smaller than a beam angle of the at least one task lighting element (1160).

The housing (1020) may provided with an access port (1500) for selectively accessing a control system (1400) located within the housing (1020). The access port (1600) may overlie an electrical interface (1500) of the control system (1400). The electrical interface (1500) may be communicatively coupled to hardware of the control system (1400) to enable revisions to firmware stored on the hardware. The electrical interface (1500) may communicatively coupled to hardware of the control system (1400) to enable an accessory device to electrically connect to the control system (1400) and/or to be powered by a power source of the control system (1400). A cover element (1620) may be removably secured to a base portion of the housing (1020) over the access port (1600) via a mechanical interface (1640).

The light-emitting system may further include an accessory device (1800) interchangeably attachable to the mechanical interface (1640) to enhance functionality of the light-emitting system (1000). The accessory device (1800) may comprise one of the following: a supplemental lighting unit; a sensor unit; a wireless communications module; and a tracking module. The accessory device (180) may be a supplemental lighting unit comprising one or more supplemental lighting elements that are selectively illuminable by the user. The accessory device (1800) may be a sensor unit comprising one or more sensors to obtain data from which to enhance functionality of the light-emitting system (1000). For example, the one or more sensors may be arranged to obtain biometric, environmental, location, motion, impact and/or other data from which to provide enhanced functionalities. The accessory device (1800) may be a communications module that interfaces with the control system (1400) to provide wireless communication between the light-emitting system and a remote computing device. The accessory device (1800) is a tracking module configured to provide position data of the light-emitting system or user for tracking or other purposes.

The light-emitting system may further include or operate in conjunction with aspects of the devices, systems and methods disclosed in U.S. Pat. No. 8,529,082, U.S. Pat. Pub. No. 2019/0156642, and International Application No. PCT/US2019/054577, filed Oct. 3, 2019 and entitled "Suspension Unit for a Helmet," which are all assigned to the present applicant, Illumagear Inc., the entire contents of which are hereby incorporated by reference.

For example, the light-emitting system may further include an array of independently addressable lighting elements, a location receiver and one or more communication interfaces, and may be utilized as a signaling device, along with other like signaling devices, of a configurable site safety system. The configurable site safety system may also include a site safety server to track location information received from at least each of the signaling devices, and to cause, based on a subset of the plurality of signaling devices satisfying defined geographical, event-based or other defined criteria, the lighting array of each of the subset of signaling devices to display a defined lighting scheme.

DETAILED DESCRIPTION

Figure 1:
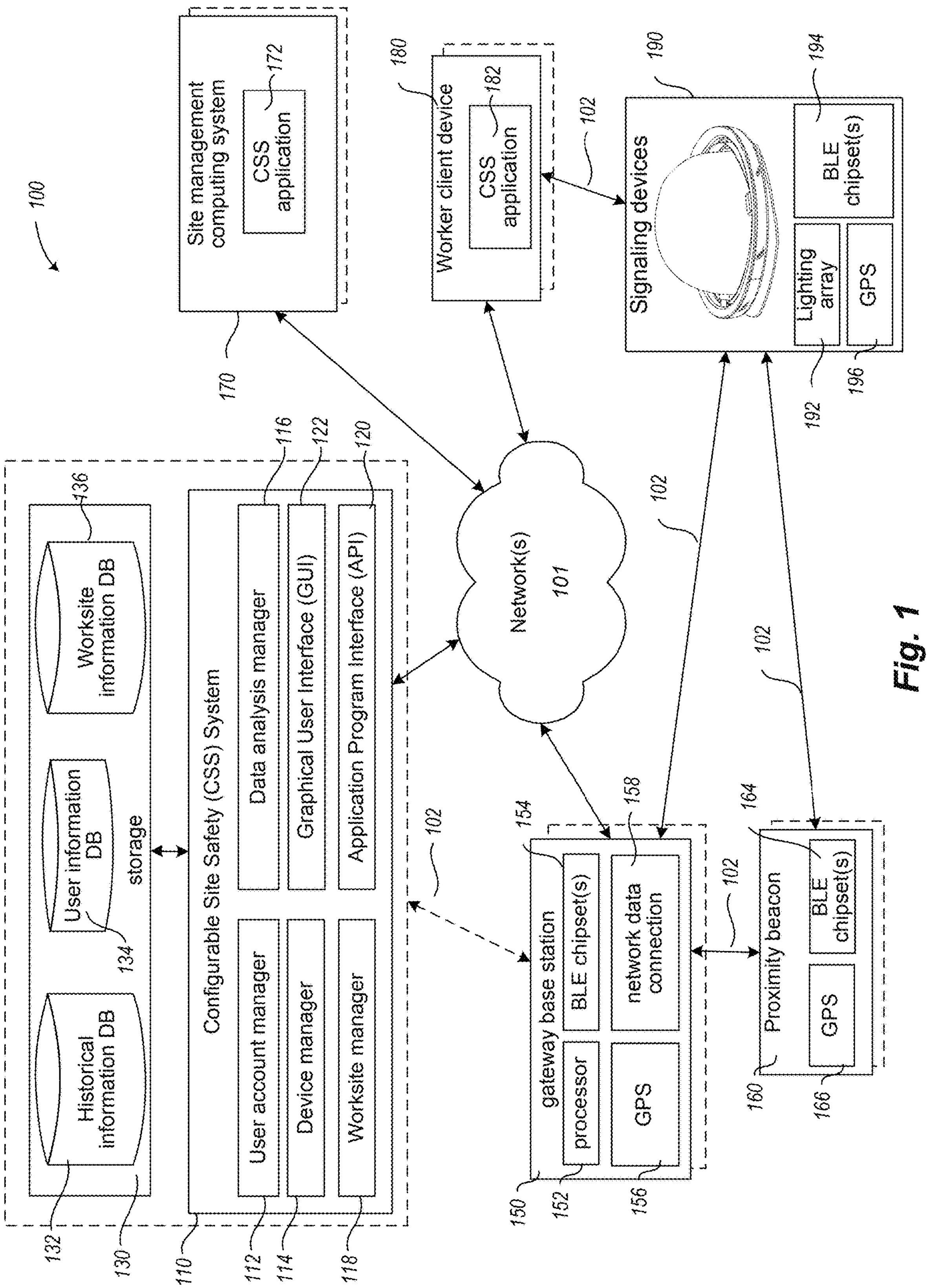
FIG. 1 is a schematic diagram of a networked environment that includes a Configurable Site Safety ("CSS") system as well as various devices and/or computing systems associated with the CSS system, with one or more managing users of the CSS system, and with one or more non-managing users of the CSS system, as described in the present disclosure.

Light-emitting systems are described herein. In addition, techniques are described herein for configuring and facilitating improved tracking, visibility and identification of workers and other users, such as may be associated with one or more geographical locations. In addition, such techniques may provide alerts and notifications for and regarding such users, and may further provide various analyses of tracked information related to such users, geographical locations, alerts and notifications. Some or all of the techniques described herein may be performed by automated operations of an embodiment of a Configurable Site Safety ("CSS") system, as discussed in greater detail below, which CSS system may include one or more signaling devices in the form of the light-emitting systems described herein.

As used herein, the term "user" may refer to any human operator of a device or system described in the present disclosure, while the term "worker" may refer to any user associated with a particular signaling device of such system. The term "worksite" may refer to any geographical location associated with multiple such workers, and may include recreational as well as industrial and professional locations. The term "selecting," when used herein in relation to one or more elements of a graphical user interface or other electronic display, may include various user actions taken with respect to various input control devices depending on the client computing device used to interact with the display, such as one or more clicks using a mouse or other pointing device, one or more tapping interactions using a touch screen of a client device, etc. In addition, such selecting may additionally comprise interactions with various physical actuators capable of generating electrical or electronic signal as a result of such interactions. A nonexclusive list of examples of such actuators include electronic, mechanical or electromechanical implementations of keys, buttons, pressure plates, paddles, pedals, wheels, triggers, slides, touchpads, or other touch- or motion-sensitive element, and may be digital or analog in nature. Also as used herein, unless specifically disclaimed any "alert" may incorporate visual, auditory, haptic, or other information conveyed to a user.

In certain embodiments, multiple workers proximate to a geographical worksite are each associated with a light emitting system or unit in the form of a wearable "halo" signaling device (occasionally referred to herein as simply a "halo device"). A halo device may include a power source and a lighting array including a plurality of LED or other lighting elements. The lighting array may comprise various physical configurations of the individual lighting elements, and in at least some embodiments such individual lighting elements may be position- and hue-addressable, such as to control the color and state of each element independently of or in conjunction with the other elements of the lighting array. In addition, a halo device may include a microcontroller or other processor, one or more memories storing various configuration information (such as in upgradable firmware or other manner), a GPS interface and chipset for determining a geographical location of the halo device, and various communications interfaces for communicating with other halo devices and additional components of a CSS system. For example, a halo device may include one or more BLE ("Bluetooth low energy") and additional component chipsets for transmitting and receiving identification, location, and status information, and/or other wireless communications components for such functions; in various embodiments, such chipsets may include transceivers, sensor chipsets, and other component chipsets. In certain embodiments, a halo device may include an accelerometer, such as to detect sudden acceleration or impact that might indicate possible trauma or injury to the worker wearing the halo device, as well as one or more manual controls (e.g., buttons, touch controls, or other physical actuators) in order to activate various functions of the halo device such as power and manual selection of particular lighting schemes or modes, as described in greater detail elsewhere herein. In addition, a halo device may further include various other components, such as one or more biometric sensors, such as to detect biometric information regarding a user of the halo device (e.g., a pulse rate sensor, carbon monoxide or carbon dioxide sensor, etc.) and provide related alerts; audio speakers for conveying audible alerts; vibration-enabled components for conveying haptic alerts; or other components for sensing or conveying particular information to the wearer of the halo device.

Each halo device may have one of multiple form factors. For example, a halo device may substantially comprise a ring form factor that is mountable or otherwise removably interfaced with a standardized "hard hat" or other safety-oriented headgear, similar to, for example, the light-emitting devices shown and described in U.S. Pat. No. 8,529,082, which is assigned to the present applicant, Illumagear Inc., and the content of which is incorporated herein by reference in its entirety. In such use, the particular elements of the halo device's lighting array may be arranged such that the lighting array forms a band around the head of the associated user that is n-elements wide. In other embodiments, the halo device may be integrated into such rigid headgear directly (i.e., not removable from the hard hat). In still other embodiments, a signaling device may comprise a vest, a mesh grid, wristbands, attachments for independently worn items such as clothing and jewelry, or other wearable form factor. In other instances, the signaling device may comprise a non-wearable form factor, such as an appropriately configured road flare or traffic cone, which may be controlled to illuminate in accordance with the various functionalities described herein. As used elsewhere herein, a halo device may be assumed to comprise the removable ring form factor described above unless context indicates otherwise.

In at least some embodiments, the CSS system may allow a user to configure the lighting array of one or more halo devices to emit various lighting schemes, such as to differentiate the wearer of a halo device from one or more other workers. Such lighting schemes may include particular colors, animations, or flashing patterns. For example, halo devices associated with a first subset of workers within a worksite may be configured to emit a solid bright green, while halo devices associated with a second subset of workers within that same worksite may be configured to emit a solid bright blue. Combinations of colors may also be used, such as to alternate individual lighting elements or groups of lighting elements in a halo device's lighting array.

In various circumstances, the lighting array of a halo device may be configured to flash at a particular rate, such as to flash slowly between a predefined color pattern and 'off' to identify a particular worker among other workers having halo devices of the predefined color pattern (e.g., one worker's halo flashing blue, while those around him remain steadily blue without flashing); to flash quickly between two or more predefined color patterns (e.g., a halo device detecting a sudden acceleration or impact may be configured to automatically begin flashing red to alert those around the associated worker); to flash between multiple defined brightness levels (either in conjunction with or in lieu of a corresponding change of color); etc.

In addition, the lighting array of a halo device may be physically or logically segmented into multiple addressable regions. For example, in certain embodiments a halo device having the ring form factor may include a front-facing region having lighting elements that emit a bright white glow (such as to provide higher visibility for the worker under poor lighting conditions, in a manner similar to a headlamp), while the remaining portion of the lighting array is configured to provide an identifying color or animation scheme as described above. In at least some embodiments, a halo device having the ring form factor may further include logical segments corresponding to the front, back, and respective sides of the associated worker's headgear.

In operation, a plurality of halo signaling devices proximate to a particular worksite may maintain communication with one or more gateway base stations associated with the worksite. In certain embodiments, the halo devices may provide location information to the gateway base stations, to one another (such as via a halo-enabled mesh network), or directly to a site management server. In certain scenarios, implementing multiple gateway base stations across a single large worksite may allow the CSS system to extend the tracking range for connected halo devices while limiting the power consumption or wireless communications hardware required for such halo devices to maintain a connection with the CSS system. In addition, in various implementations, communications components having a longer range may be incorporated into the halo signaling devices such that the connectivity of the halo signaling devices is extended without incorporating a gateway base station into the network.

In addition to worker-associated halo signaling devices and gateway base stations, a particular worksite may include one or more proximity beacons, such as may be removably coupled to a structure, to a vehicle, or to other movable equipment. Such proximity beacons may include a GPS interface and chipset in a manner similar to a halo signaling device, as well as one or more communications interfaces for communicating with halo devices and gateway base stations, and in certain implementations may further include a lighting array and/or components for providing audio feedback (speaker, siren, etc.). In operation, a proximity beacon allows the CSS system to monitor the location, direction, or movement of any vehicle or equipment on which the proximity beacon has been mounted. Based on such monitoring, the CSS system may cause the lighting array of all or a subset of nearby halo devices to emit a predefined lighting scheme, and/or may provide other appropriate notifications. As one example, upon detecting that a proximity beacon has begun moving in a particular direction, the CSS system may cause the lighting array of all halo devices within a predefined distance of the expected movement path to flash yellow. In this manner, the CSS system may provide both the driver of the vehicle associated with the proximity beacon, as well as nearby workers, with a visual indication that caution should be exercised with respect to the vehicle that is now in motion and any workers that may be located within its path. As another example, even if the proximity beacon is not in motion, the CSS system may cause the lighting array of all halo devices within a predefined distance of that proximity beacon to emit a predefined lighting scheme other than those located a greater distance from the proximity beacon.

The CSS system may cause a subset of worksite-associated halo signaling devices to emit particular predefined lighting schemes in response to particular events. For example, a particular predefined lighting scheme may be applied to a halo device exiting the worksite, or entering particular predefined zones of the worksite; to a halo device that has detected an absence of movement for a predefined duration (such as to provide an alert if the halo has been lost or discarded, or if a user of the halo has been incapacitated); to a halo device that has registered an impact, such as that exceeds one or more defined thresholds (e.g., Light, Medium, Heavy, Severe, etc.) with respect to force or acceleration; to all halo devices within a worksite at particular times (e.g., at breaks, at shift end, or at shift change); to all halo devices within the worksite in response to an evacuation order, injury, or other unscheduled event; to all halo devices determined to be in proximity to external stimuli (e.g., approaching vehicle headlights or noise exceeding a predetermined threshold volume), etc. In addition, the CSS system may cause a subset of halo signaling devices to emit a particular predefined lighting scheme based on criteria satisfied by workers associated with those halo devices. For example, a particular lighting scheme may be applied to all halo devices associated with workers having a particular worksite role (e.g., drivers, engineers, equipment operators, foreman, supervisors, etc.); with workers having a particular experience level; with particular identified workers; or other specified criteria.

In certain embodiments, the CSS system may provide alerts in a manner other than the display of a particular predefined lighting scheme, either in lieu of or in conjunction with such a display. For example, the CSS system may initiate one or more notifications to users of the CSS system via an application associated with the CSS system and executing on one or more devices associated with such users; via haptic or audible alert; via electronic text messaging, electronic mail, or other textual communication; or other appropriate messaging. As one particular example, if an impact alert is received from a halo device, one alert may be provided by causing the particular halo device to emit a predefined lighting scheme, while another alert may be simultaneously provided to one or more computing devices associated with additional users of the CSS system, such as a safety manager, worksite supervisor, etc.

Various operations of the CSS system may be configured using a site management computing system communicatively coupled to one or more gateway base stations that are associated with a worksite, as well as with the halo signaling devices and proximity beacons associated with and/or proximate to that worksite. In certain embodiments and scenarios, a site management server may be associated with multiple worksites, so as to track and configure devices across those multiple worksites, using consistent configuration parameters across such worksites or using multiple worksite-specific configurations for the corresponding devices. The CSS system may provide a user of the site management server with a visual display indicating the locations of all connected halo signaling devices, gateway base stations, and/or proximity beacons. In addition, the CSS system may provide a user of the site management server with additional functionality, including but not limited to: configuring events to be associated with particular notifications and/or halo device lighting schemes; configuring geographical areas or "zones" to be associated with particular notifications and/or halo device lighting schemes; defining criteria for identification of one or more workers, such as to cause a subset of halo devices to emit a predefined lighting scheme based on such identifying worker criteria (e.g., to have the halo signaling devices associated with workers having under one year of experience temporarily emit green, flash, and/or other lighting scheme); receiving information regarding one or more workers associated with a selected halo device; etc. In at least some implementations, the CSS system may recognize a "new" halo signaling device that comes within a threshold proximity to an existing halo signaling device, proximity beacon, or other device associated with the CSS system, such as if a new worker brings his or her personal halo signaling device to a worksite.

In some embodiments, certain operations of the CSS system and one or more halo devices may be configured using a worker client device executing an application associated with and/or provided by the CSS system. In addition, a worker associated with a halo device may also configure particular aspects of the halo device using the worker client device, such as by establishing a link (e.g., a Bluetooth connection) between the client device and the halo device. For example, a worker may select to receive particular audible and/or visual alerts via the associated client device, in addition to any halo device lighting scheme associated with such alerts.

FIG. 1 is a schematic diagram of a networked environment 100 that includes a Configurable Site Safety ("CSS") System 110, gateway base stations 150, proximity beacons 160, a site management computing system 170, worker client devices 180, and a plurality of halo signaling devices 190 associated with a plurality of workers (not shown). The site management computing system, worker client devices, and gateway base stations are each communicatively coupled to the CSS system 110 via one or more intervening networks 101. In addition, the gateway base stations 150 are communicatively coupled to the halo signaling devices and proximity beacons, such as via direct wireless links 102 and chipsets 154, 164 and 194, respectively, or by other wireless communication devices, including other short-range radio devices. In the illustrated embodiment, each chipset 154, 164 and 194 may respectively include a BLE chipset, one or more transceivers, sensor chipsets, and other component chipsets. Each of the gateway base stations, proximity beacons and halo signaling devices also respectively include GPS chipsets 156, 166, and 196, for determining a geographical location of the respective device. The gateway base stations further include a networked data connection 158, and in certain implementations, each of the halo signaling devices may link directly to one or more computer networks (e.g., the Internet) using any appropriate high-speed data mobile wireless communication methods, components and/or protocols. Each of the halo signaling devices 190 additionally includes a lighting array 192, such as an LED array, and may further include additional auditory or haptic signaling components, as described elsewhere herein. In operation, the gateway base stations 150 receive ID, status and location information from each of the respective proximity beacons and halo signaling devices, and provide the received information to the site management computing system, the CSS system, or both. In various implementations, the frequency with which the information for each of the proximity beacons and halo devices are updated may be configured appropriately.

Although not illustrated in the example embodiment of FIG. 1, it is appreciated that each halo signaling device 190 may be communicatively coupled to one or more other halo signaling devices 190 to facilitate inter-device communications and other functionality described herein.

In the depicted implementation, the CSS system 110 includes a user account manager 112, a device manager 114, a data analysis manager 116, and a worksite manager 118. In addition, the CSS system includes an Application Program Interface ("API") 120 and a Graphical User Interface ("GUI") 122. The CSS system is communicatively coupled (locally or remotely) to storage facility 130, which includes historical information database 132, user information database 134, and worksite information database 136. In certain implementations, the storage facility 130 may be incorporated within or otherwise directly operated by the CSS system; in other implementations, some or all of the functionality provided by the storage facility may be provided by one or more third-party network-accessible storage service providers.

The interactions of the CSS system 110 with the site management computing system 170 and worker client devices 180 may occur in various ways, such as in an interactive manner via a graphical user interface 122 that is provided by the CSS system to users of the computing system and client devices via at least some Web pages of a CSS system Web site. Information provided by the Web site may also be provided in a programmatic manner by one or more client software applications via the Application Program Interface ("API") 120 provided by the CSS system that allows computing systems and/or programs to invoke such functionality programmatically, such as using Web services or other network communication protocols. In the illustrated implementation, various interactions between the CSS system and the site management computing system 170 and worker client devices 180 may be performed using a web browser (not shown) or CSS application 172 or 182, each of which may respectively be executing on the associated computing system or client device. As used herein, either or both of the site management computing system 170 and worker client devices 180 may be fixed or mobile, and may include instances of various computing devices such as, without limitation, desktop or other computers (e.g., tablets, slates, etc.), database servers, network storage devices and other network devices, smart phones and other cell phones, smart watches or other wearable devices, consumer electronics, digital music player devices, handheld gaming devices, PDAs, pagers, electronic organizers, Internet appliances, and various other consumer products that include appropriate communication capabilities.

In the depicted networked environment 100 of FIG. 1, the network 101 is a publicly accessible network of linked networks, possibly operated by various distinct parties, such as the Internet. In other implementations, the network 101 may have other forms. For example, the network 101 may instead be a private network, such as a corporate or university network that is wholly or partially inaccessible to non-privileged users. In still other implementations, the network 101 may include both private and public networks, with one or more of the private networks having access to and/or from one or more of the public networks. Furthermore, the network 101 may include various types of wired and/or wireless networks in various situations. In addition, in this illustrated example of FIG. 1, users may utilize client computing systems and/or other client devices to interact with the CSS system 110 to obtain various described functionality via the network 101, and in doing so may provide various types of information to the CSS system 110. Moreover, in certain implementations, the various users and providers of the networked environment 100 may interact with the CSS system and/or one or more other users and providers using an optional private or dedicated connection, such as one of dedicated connections 102.

Various example graphical user interface ("GUI") screens generated by the CSS system will now be presented with respect to particular embodiments shown for illustrative purposes, although it will be appreciated that other embodiments may include more and/or less information, and that various types of illustrated information may be replaced with other information. In particular, FIGS. 2A-2D illustrate examples of providing and receiving various functionality with respect to tracking, identification and configuration of halo devices and other devices associated with the CSS system and its users.

Figure 2A:
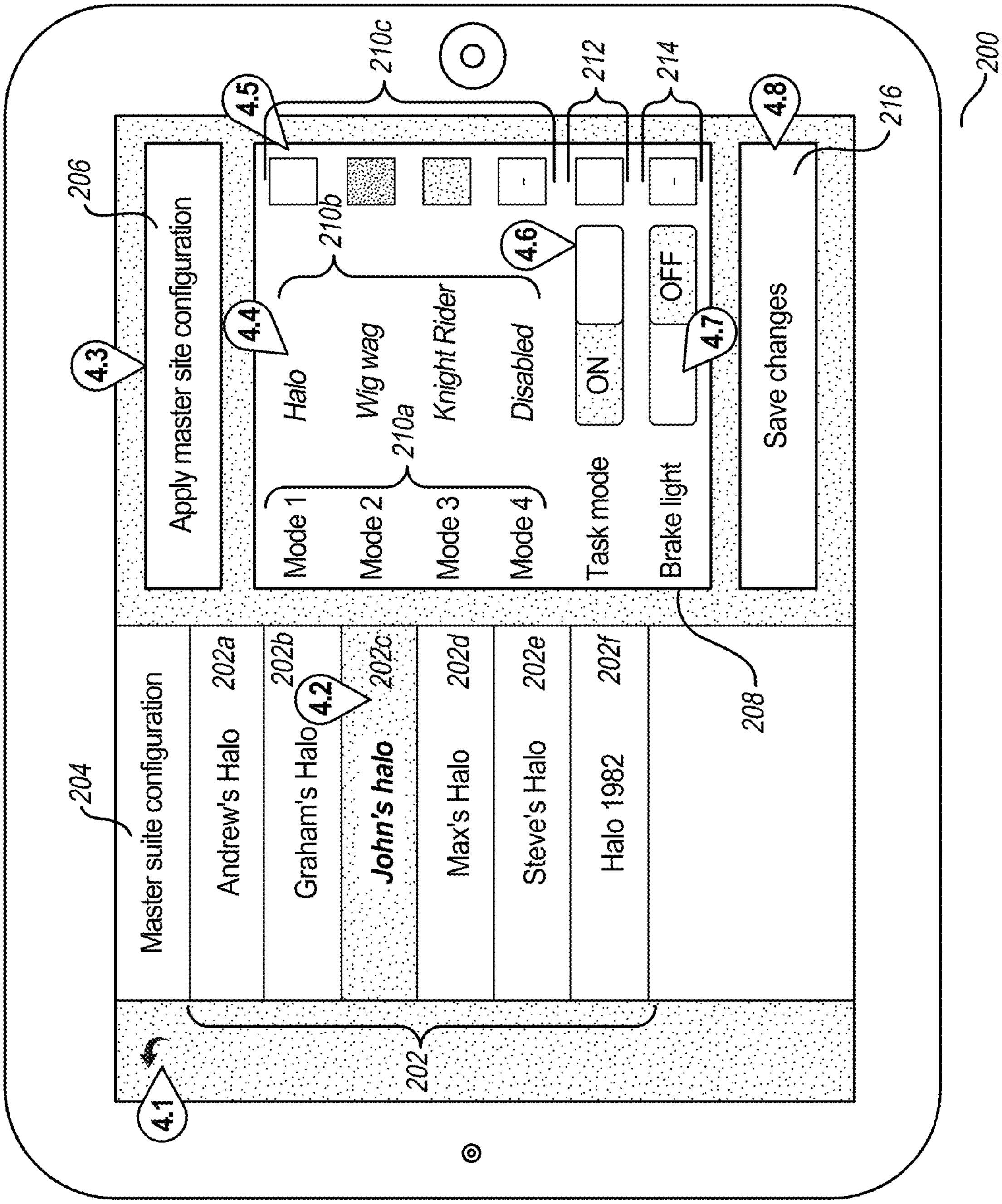
FIGS. 2A through 2D illustrate examples of providing a Configurable Site Safety system via various graphical user interfaces displayed on an exemplary computing system of an individual user.

FIG. 2A illustrates a GUI 200 displaying a plurality of configuration controls associated with the CSS system, such as may be displayed by site management computing system 170 of FIG. 1, either while executing an instance of CSS application 172 or otherwise interacting with the CSS system 110 via graphical user interface 122 (also with reference to FIG. 1). In the depicted embodiment, GUI 200 allows an authorized user to configure particular lighting schemes and other aspects of a lighting array associated with each of multiple halo signaling devices 190 (with reference to FIG. 1). A halo device selection panel 202 currently includes halo device selection controls 202*a*-202*f*, each of which allows the user to select for configuration a particular named halo device. Currently, the halo device identified as "John's Halo" is selected, as indicated by the selection control 202*c*. In addition to the halo device selection panel, the GUI 200 includes "Master site configuration" selection control 204, allowing the user to configure lighting scheme parameters to be associated with a default configuration for one or more particular worksites. Thus, by selecting the master configuration application control 206, the user may apply lighting schemes and other settings associated with the "Master site configuration" to each (or all) of the halo devices represented in the halo device selection panel.

The GUI 200 further includes halo configuration panel 208, which in the depicted implementation includes controls for defining and naming for distinct "modes" that may be assigned to "John's Halo" by the CSS system (such as based on a user selection of the 202*c* halo device selection control) in response to particular events or selection criteria. In certain embodiments, features described below with respect to the halo configuration panel 208 may be displayed in other configurations and circumstances as well. For example, the configuration panel 208 and particular elements included therein may be displayed by the CSS system in response to a user selection of the "Master site configuration" selection control 204. In the depicted embodiment of FIG. 2A, the halo configuration panel includes a mode index listing 210*a*, a mode identifier section 210*b*, and a color scheme definition section 210*c*. By selecting one of the color scheme definitions, a user may define a particular color scheme assigned to a mode index and associated mode identifier, such as to select a particular color and/or animation pattern to be emitted by a lighting array of the halo device when the halo device is assigned that particular mode. In addition, in the depicted implementation, by selecting the mode identifier associated with a particular mode index, an authorized user may rename the mode associated with that mode index. While in the depicted embodiment, the configuration panel includes only a single color scheme definition control for each of four modes, in other embodiments and scenarios additional modes may be defined for use within and/or by the CSS system, with each such mode presenting multiple color scheme definition controls. For example, a mode may cause one or more elements of a halo lighting array to flash between two or more colors and or brightness levels, each of which may be represented within the configuration panel by a separate color scheme definition control. In certain embodiments, while each mode may only present a single color scheme definition control within the configuration panel 208, selection of such a control may present additional elements enabling a user to specify various colors associated with the relevant mode identifier.

In at least some embodiments, the CSS system may provide access to a plurality of system- or user-defined modes, such as to enable one or more users to associate or assign such predefined or "preset" modes to one or more halos, worksites, groups, etc. Various additional elements of the GUI 200 (not shown) may thus allow the importation, use, modification, and/or saving of such predefined modes, either locally or remotely with respect to the CSS system.

The halo configuration panel further includes task mode controls 212, allowing the user to view and control whether the selected halo device is currently in a "task mode," indicating that a frontal segment of the halo device's lighting array is to provide lighting independent of the selected mode, such as to enable the wearer of the halo device to light their work area more clearly. Such "task mode" functionality may be useful, for example, for workers engaged in activities at night, underground, or in other circumstances associated with poor visibility. In certain embodiments, the CSS system may provide multiple such task modes, such as to provide different task lighting schemes (e.g., floodlight, high-brightness spotlight, low-brightness spotlight, etc.). Additionally, back light controls 214 allow the user to view and control whether the selected halo device is in a "back light mode" (interchangeably known as a "brake light mode"), in which a rear-facing segment of the halo device's lighting array emits a color pattern independent of the selected mode, such as to allow other workers near the halo device wearer to determine that the wearer is facing away from those other workers. The halo configuration panel also includes save control 216, allowing the user to save any changes made. In certain implementations, the CSS system may implement configuration information that is received via a remote computing system, such as may be associated with a client or other third party.

Figure 2B:
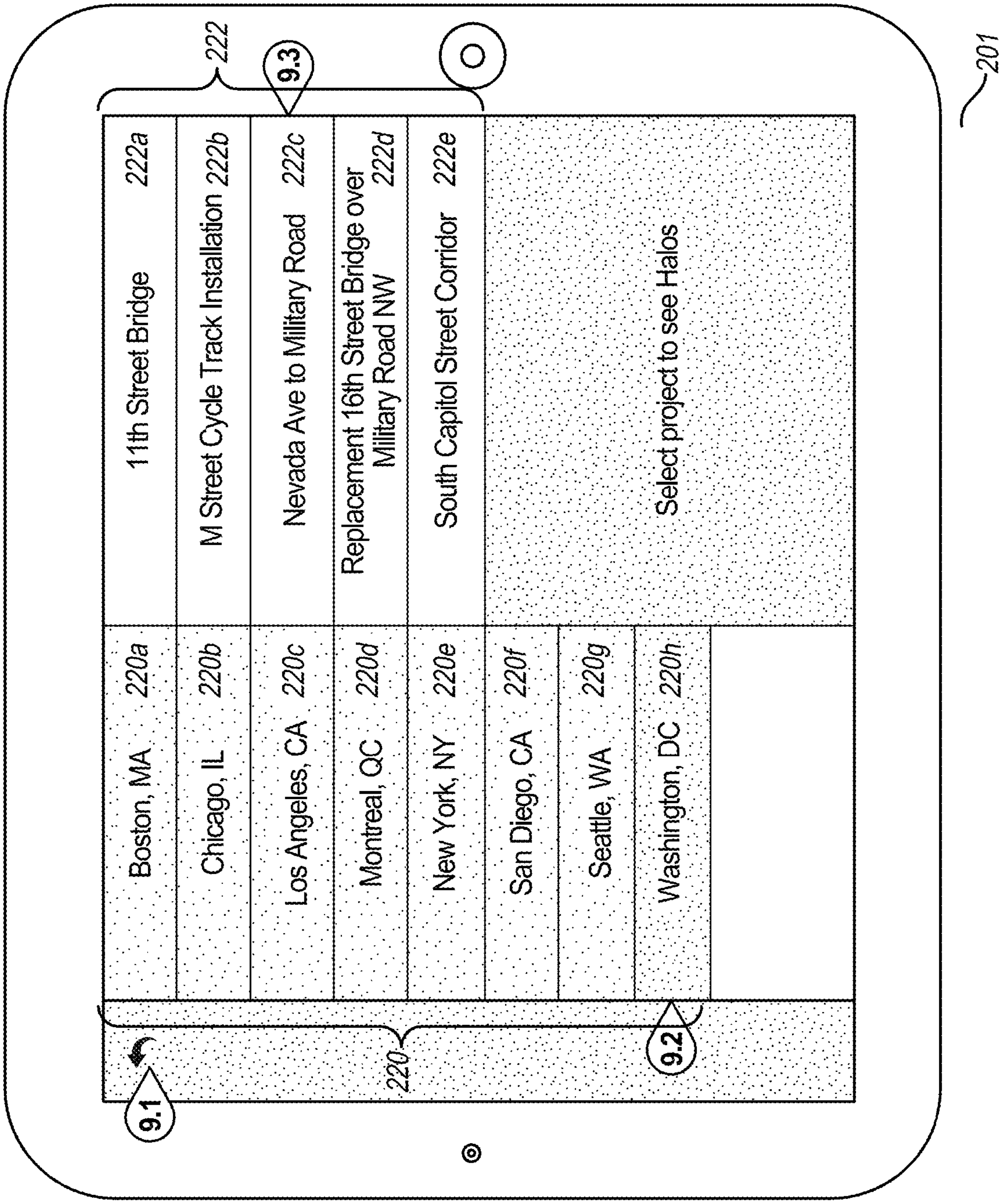

FIG. 2B shows a worksite selection GUI 201, allowing a user of a CSS system associated with multiple worksites across multiple geographical locations to select a particular such worksite for viewing its associated halo signaling devices 190 (again with reference to FIG. 1) and other associated devices. In particular, the worksite selection GUI 201 includes a geographical selection panel 220 that includes geographical selection controls 220*a*-220*h*. Currently, geographical selection control 220*h* is selected, such that worksite selection panel 222 includes additional worksite selection controls for particular worksites located in Washington DC. By selecting any of the worksite selection controls 222*a*-222*e*, the user can view a map of the selected worksite along with those devices associated with that selected worksite. In certain embodiments and circumstances, worksite information regarding multiple worksites and multiple geographic locations may be remotely retrieved from one or more databases of the CSS system, such as from worksite information database 136 of FIG. 1 or worksite information database 326 of FIG. 3, described elsewhere herein. For example, an instance of a CSS application executing locally on a user device may, in certain scenarios, initiate execution by retrieving and displaying to the user a list of geographical locations associated with one or more worksites. In other embodiments, a list of worksites may be directly displayed to the user, either in conjunction with or in lieu of such a list of associated geographical locations.

Figure 2C:
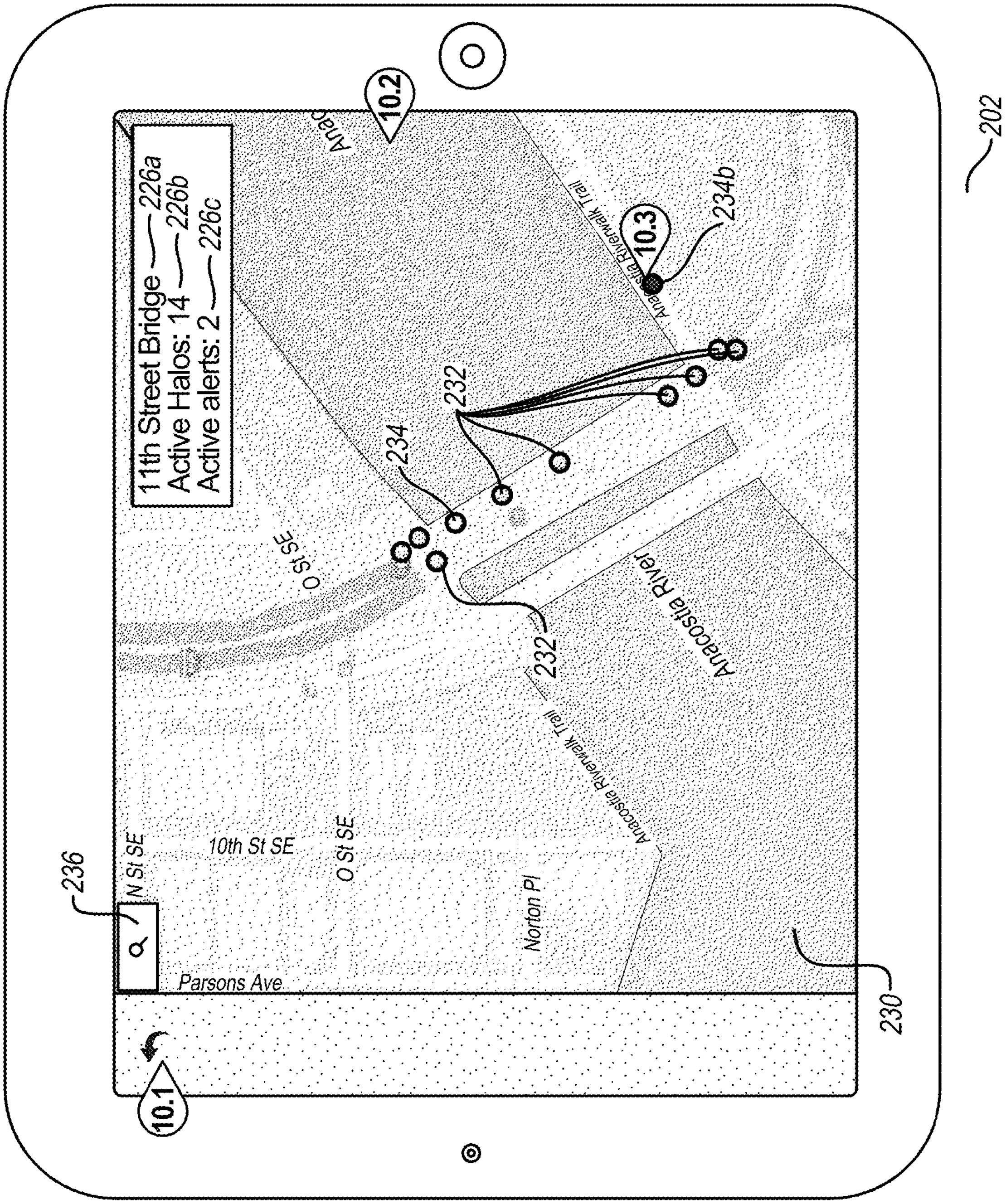

FIG. 2C shows a worksite GUI 202, such as might be displayed by the CSS system 110 upon a user selecting worksite selection control 222*a* ("11th Street Bridge") of the worksite selection GUI 201 of FIG. 2B. The worksite GUI 202 includes a worksite identifier 226*a*, as well as indicators 226*b* and 226*c*, respectively indicating that the worksite is currently associated with 14 active halo devices 190 including two halo devices that are currently subject to active alerts. A group of the active halo devices are displayed within map display area 230. In particular, non-alert halo device indicators 232 are displayed in green at their current geographical location in real time, while halo device indicators 234*a* and 234*b* are the subject of current alerts and are respectively displayed in yellow and red, also at their current geographical location in real time. In certain circumstances, the lighting arrays of the actual halo devices corresponding to halo device indicators 234*a* and 234*b* may have been assigned lighting schemes by the CSS system that correspond to the yellow and red colors of their respective halo device indicators within the map display area; in other circumstances and implementations, the color assignment of halo device indicators in the worksite GUI 202 may be independent of any particular lighting scheme assigned to the corresponding halo devices themselves.

In addition, the worksite GUI 202 includes search control 236, allowing a user to enter various criteria for identifying and/or selecting particular halo signaling devices within the selected "11th Street Bridge" worksite. In at least some implementations, upon selection of search control 236, the CSS system 110 may provide one or more selection/identification controls for the user. Upon receiving one or more selection/identification criteria, the CSS system may take various actions to identify halo devices associated with workers matching such selection/identification criteria. For example, the CSS system may cause the relevant halo device identifiers within the map display area 230 to flash, display a distinct color pattern, or display other visual indicia. Similarly, the CSS system may cause the selected/identified halo devices matching the received criteria to switch to a different "mode," either as defined using the halo configuration panel 208 of FIG. 2A or some other matter. In operation, a user that is located proximate to the "11th Street Bridge" worksite and holding a mobile site management computing system displaying worksite GUI 202 may enter selection/identification criteria (such as by using search control 236) and view, in real time, visually distinct lighting schemes emitted by the halo devices matching such criteria.

Figure 2D:
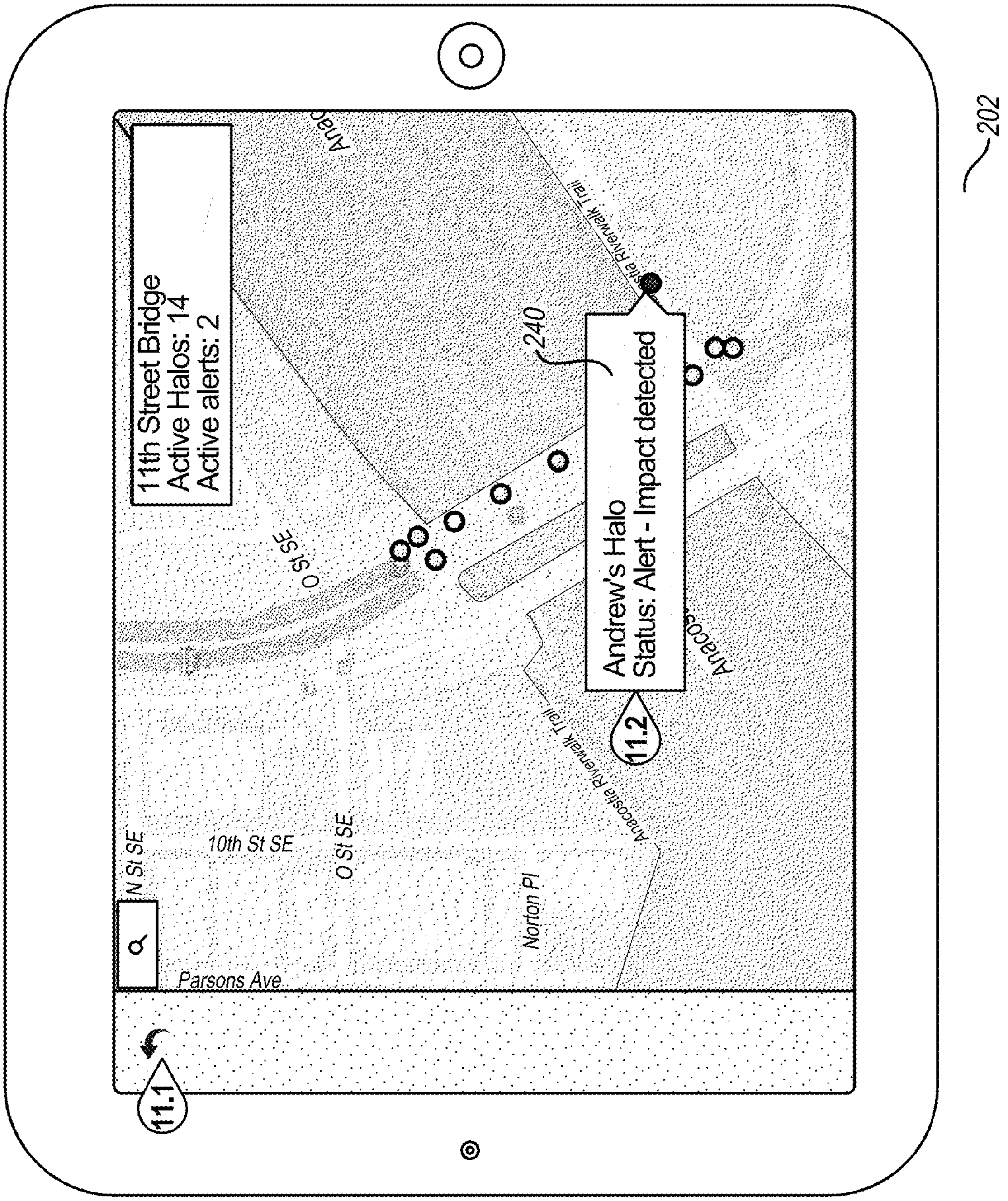

FIG. 2D displays an alternate view of worksite GUI 202, such as may be displayed if a user selects halo device identifier 234*b* (for example, to display additional information regarding the active alert currently associated with the corresponding halo device). As a result of such selection, the CSS system has provided information panel 240, which in the depicted implementation includes the halo device identifier ("Andrew's Halo") and status information indicating that the corresponding halo device has detected an impact.

It will be appreciated that the GUIs, display screens and other information presented with respect to FIGS. 2A-2D are included for illustrative purposes, and that such information and/or other information and associated functionality may be presented or otherwise provided in other manners in other embodiments. In addition, it will be appreciated that GUIs and other information presented to users may vary with the type of client device used by the user, such as to present less information and/or functionality via client devices with smaller display screens and/or less ability to present information to or obtain input from the user, such as under control of a mobile application of the CSS system interface executing on the client device, or otherwise based on information sent to the client device 180 from the CSS system 110.

Figure 3:
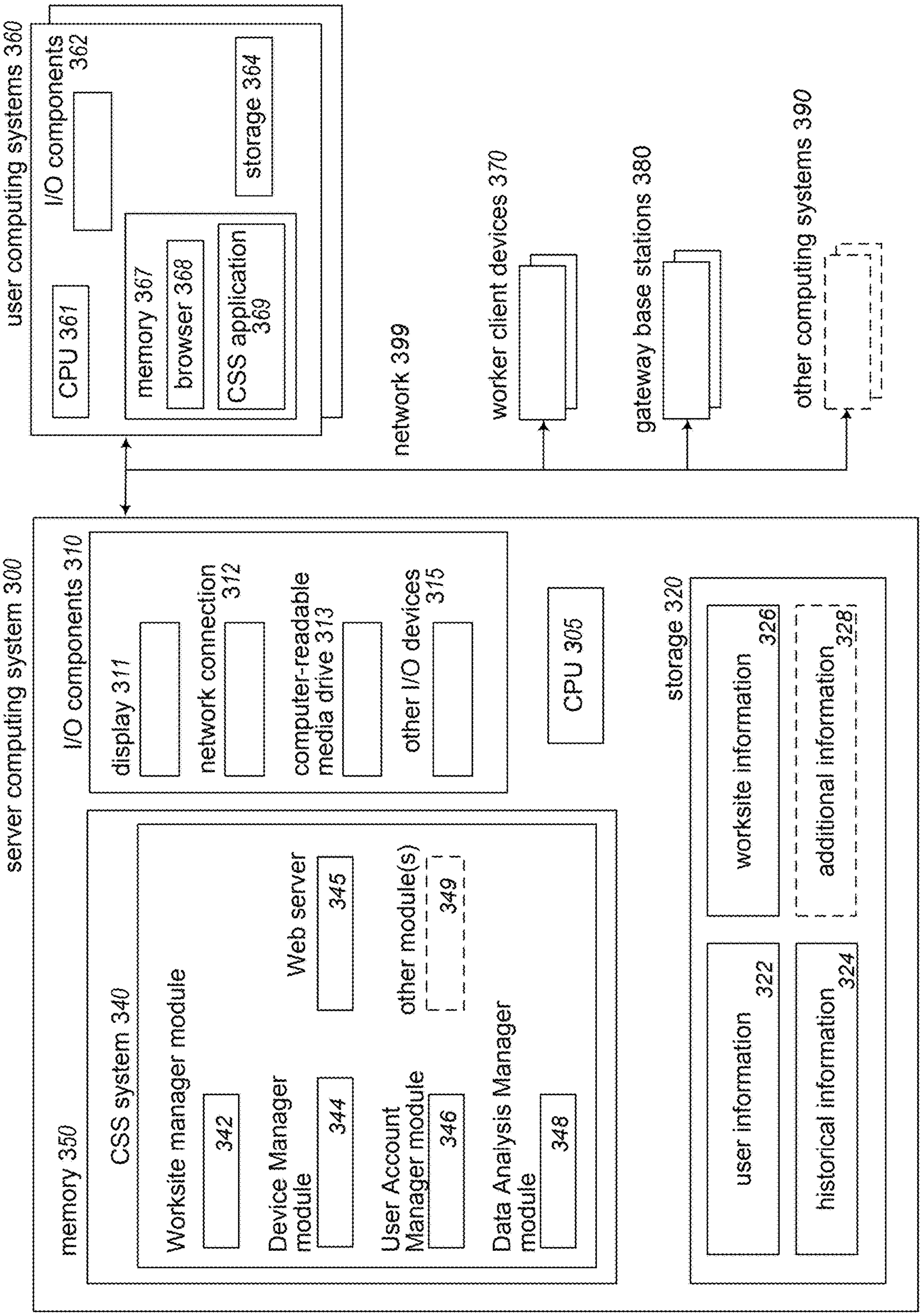
FIG. 3 is a block diagram illustrating a computing system suitable for executing an embodiment of a system that performs at least some techniques described in the present disclosure, as well as various devices and/or computing systems connected thereto.

FIG. 3 is a block diagram illustrating component-level functionality provided by a plurality of electronic circuits that, when in combined operation, are suitable for performing and configured to perform at least some of the techniques described herein. In the particular implementation depicted, the plurality of electronic circuits is at least partially housed within a server computing system 300 executing an implementation of a CSS system 340. The server computing system 300 includes one or more central processing units ("CPU") or other processors 305, various input/output ("I/O") components 310, storage 320, and memory 350, with the illustrated I/O components including a display 311, a network connection 312, a computer-readable media drive 313, and other I/O devices 315 (e.g., keyboards, mice or other pointing devices, microphones, speakers, GPS receivers, etc.). The server computing system 300 and CSS system 340 may communicate with other computing systems via one or more networks 399 (e.g., the Internet, one or more cellular telephone networks, etc.), such as user computing systems 360, worker client devices 370, gateway base stations 380, and other computing systems 390. Some or all of the user computing systems 360 and other computing systems 390 may similarly include some or all of the types of components illustrated for server computing system 300 (e.g., to have a CSS system client application 369 executing in memory 367 of a user computing system 360 in a manner analogous to CSS system 340 in memory 350).

In the illustrated embodiment, an embodiment of the CSS system 340 executes in memory 350 in order to perform at least some of the described techniques, such as by using the processor(s) 305 to execute software instructions of the system 340 in a manner that configures the processor(s) 305 and computing system 300 to perform automated operations that implement those described techniques. As part of such automated operations, the CSS system 340 and/or other optional programs or modules 349 executing in memory 330 may store and/or retrieve various types of data, including in the example database data structures of storage 320. In this example, the data used may include various types of user information in database ("DB") 322, various types of historical information (such as halo device tracking information) in DB 324, various types of worksite information in DB 326, and/or various types of additional information 328, such as various analytical information related to one or more devices or worksites associated with the CSS system.

It will be appreciated that computing system 300 other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, biometric monitoring devices, digital music player devices, handheld gaming devices, PDAs, wireless phones, Internet appliances, and various other consumer products that include appropriate communication capabilities. In addition, the functionality provided by the illustrated CSS system 340 may in some embodiments be distributed in various modules. Similarly, in some embodiments, some of the functionality of the CSS system 340 may not be provided and/or other additional functionality may be available. In addition, in certain implementations various functionality of the CSS system may be provided by third-party partners of an operator of the CSS system. For example, data collected by the CSS system may be provided to a third party for analysis and/or metric generation.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the CSS system 340 and/or CSS client software executing on user computing systems 360 and/or worker client devices 370) and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
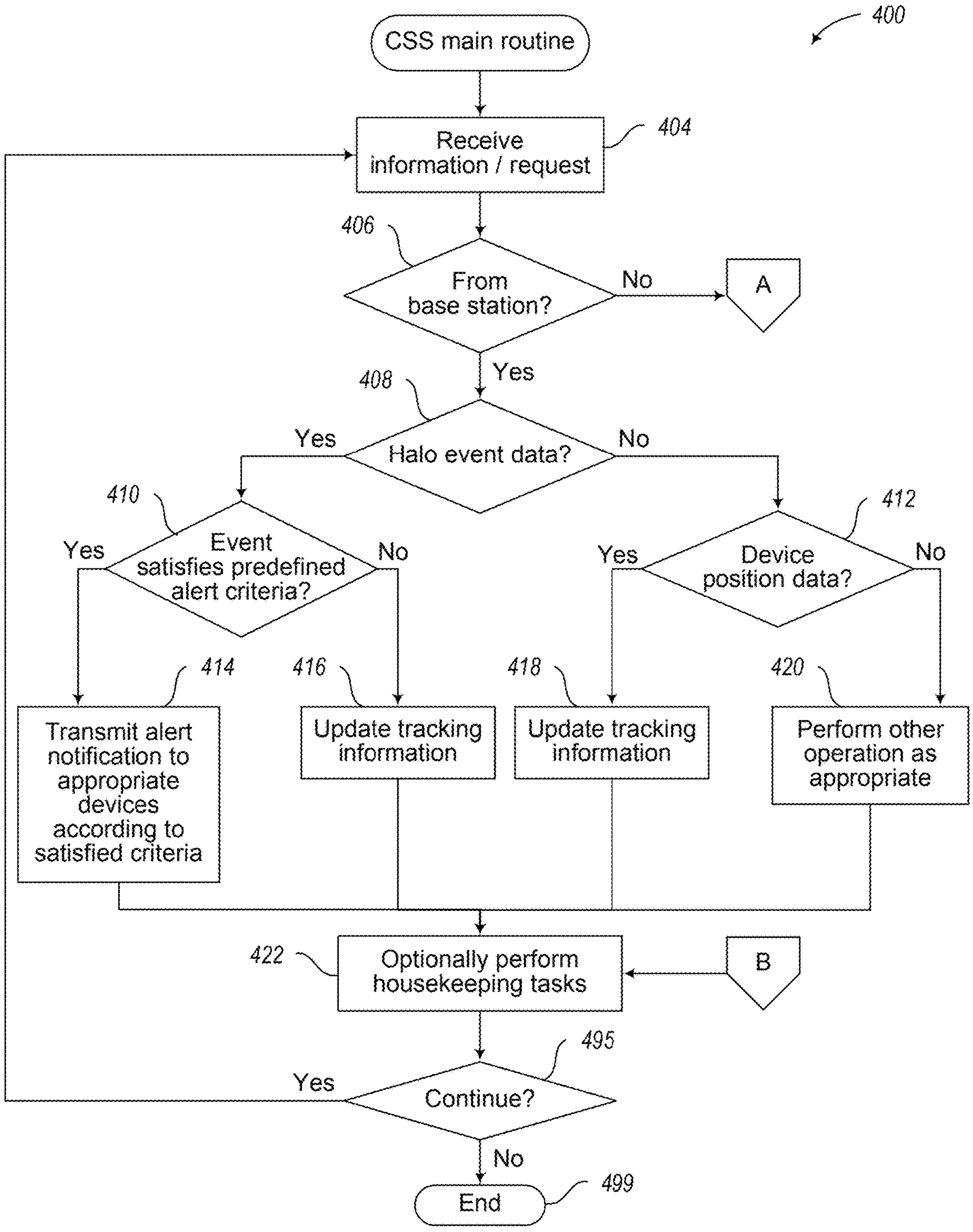
FIGS. 4A and 4B provide a block diagram illustrating an overview of operations according to an embodiment of a Configurable Site Safety system as described in the present disclosure.
Figure 4B:
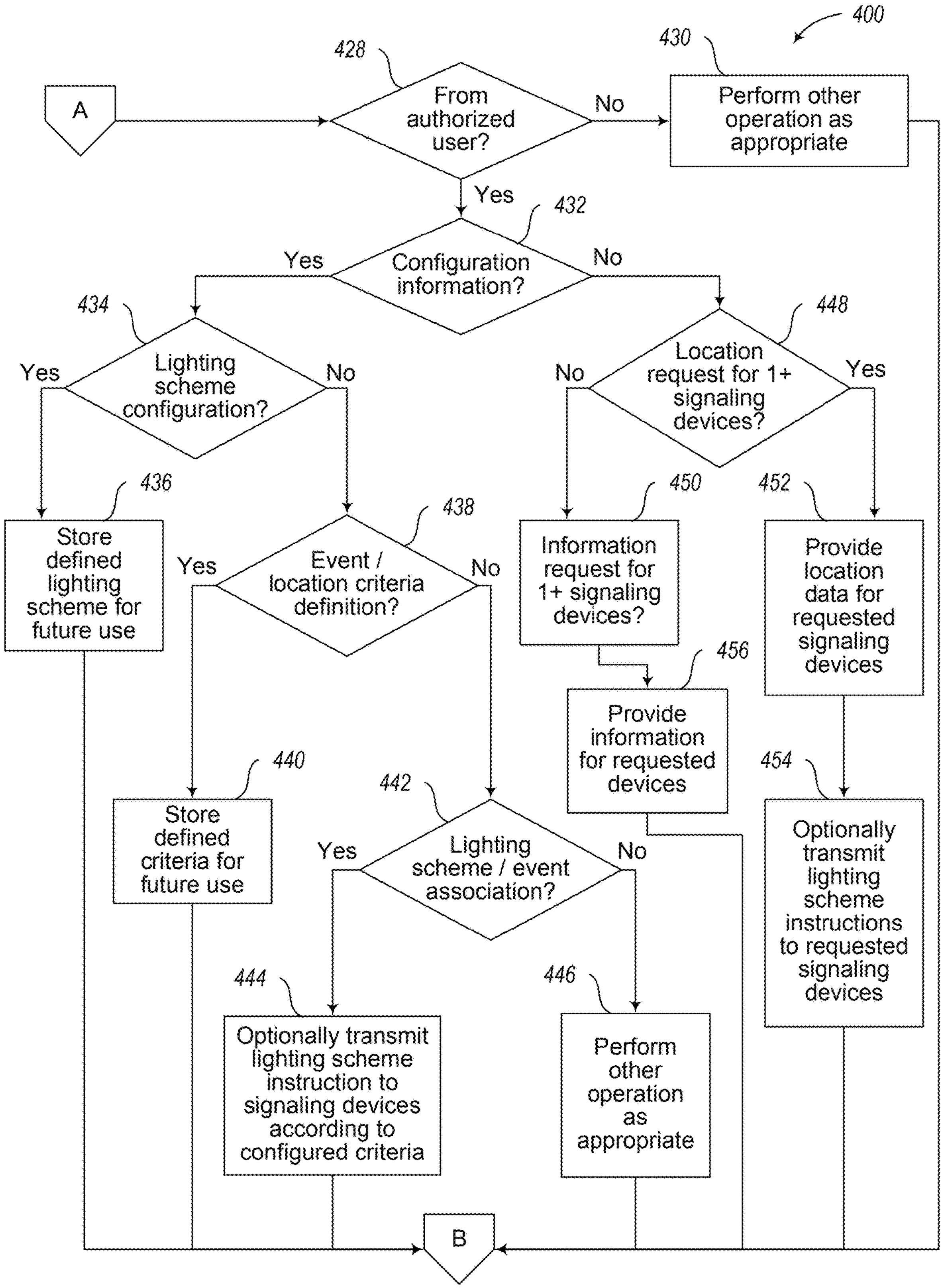
Figure 5:
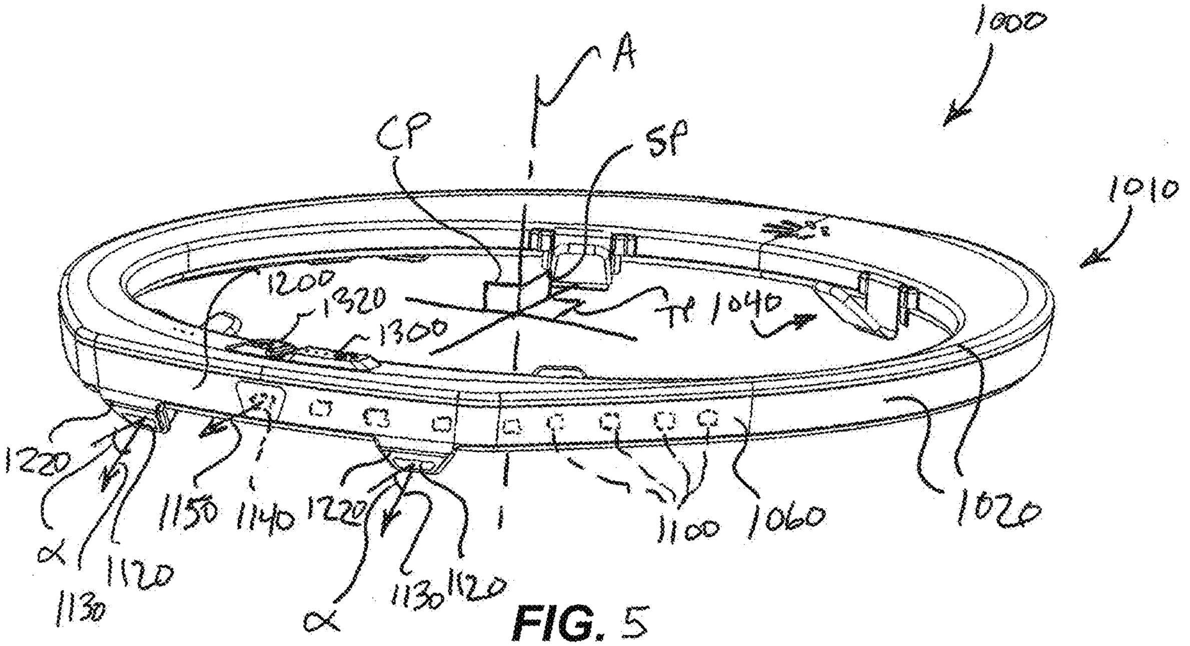
FIG. 5 illustrates one example embodiment of a signaling device in the form of a light-emitting system from a top perspective, which may be used in connection with aspects of the CSS systems described herein.
Figure 6:
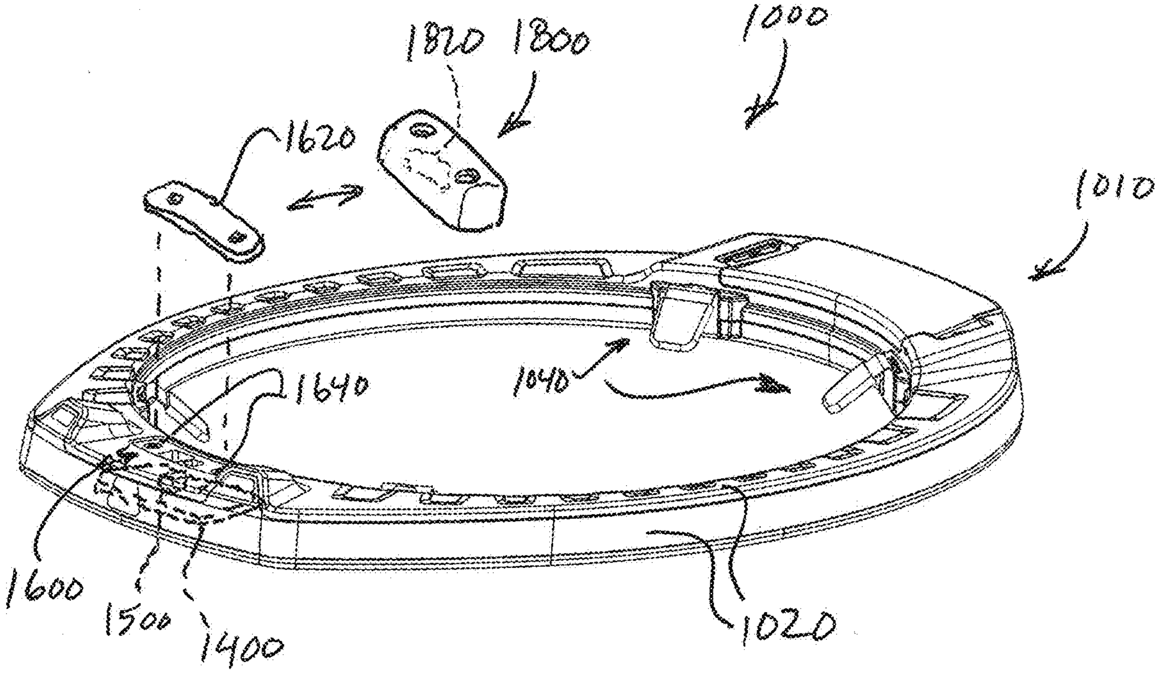
FIG. 6 illustrates the light-emitting system of FIG. 5 from a bottom perspective.
Figure 7:
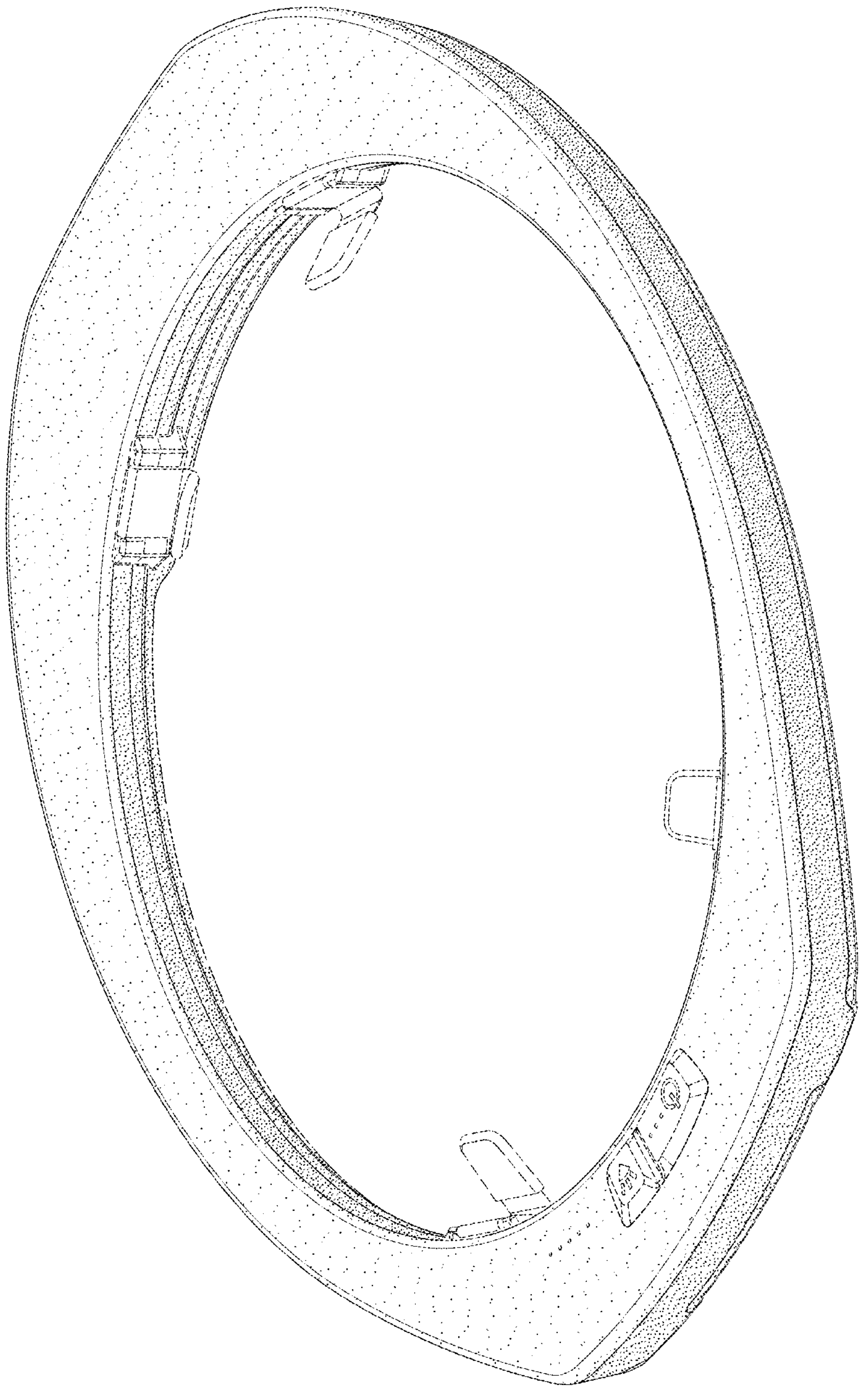
FIGS. 7-14 provide isometric and orthographic views of the light-emitting system of FIG. 5.
Figure 8:
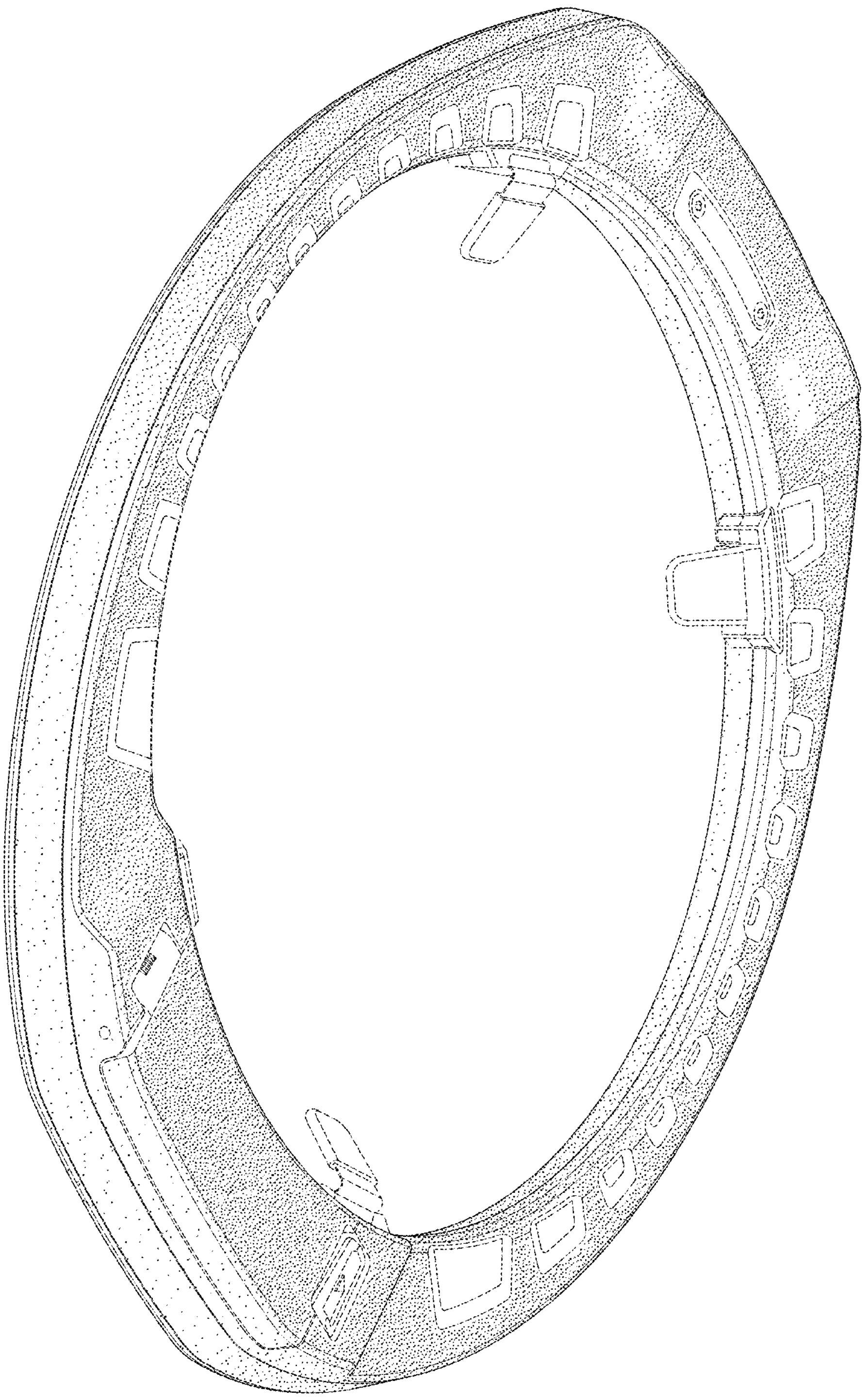
Figure 9:
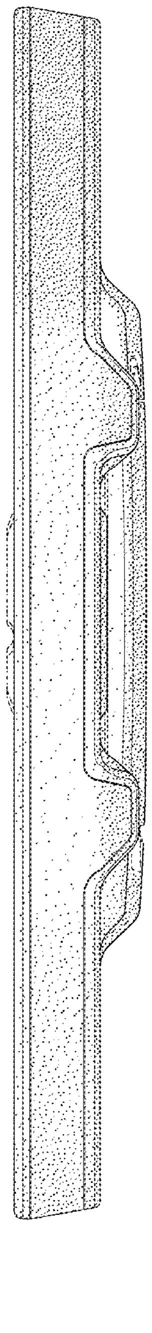
Figure 10:
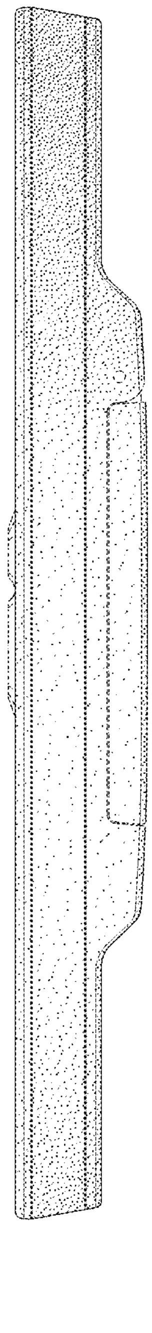
Figure 11:
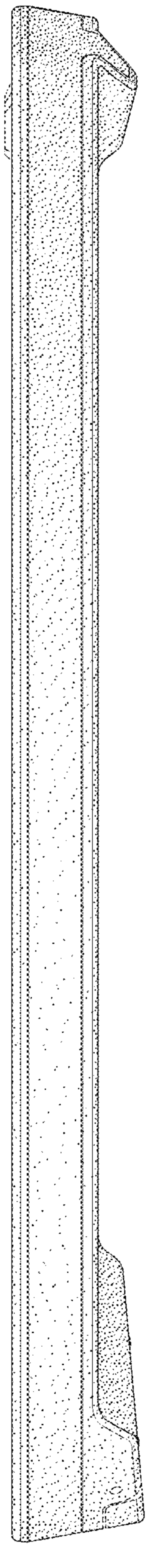
Figure 12:
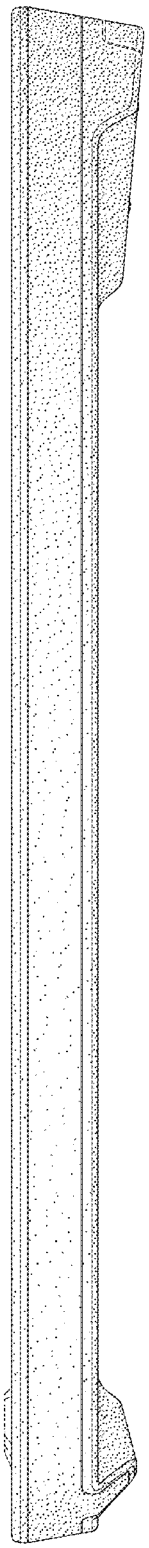
Figure 13:
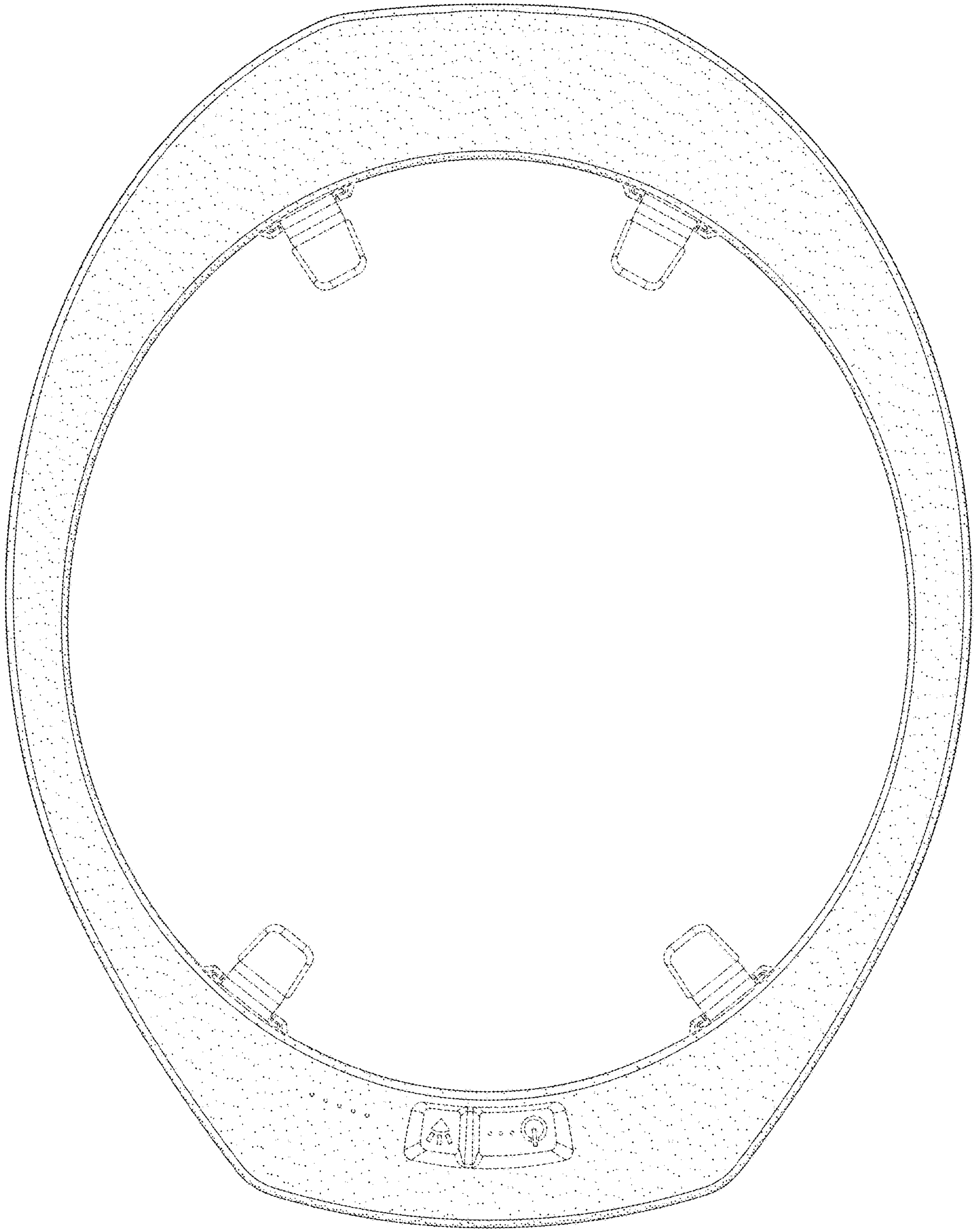
Figure 14:
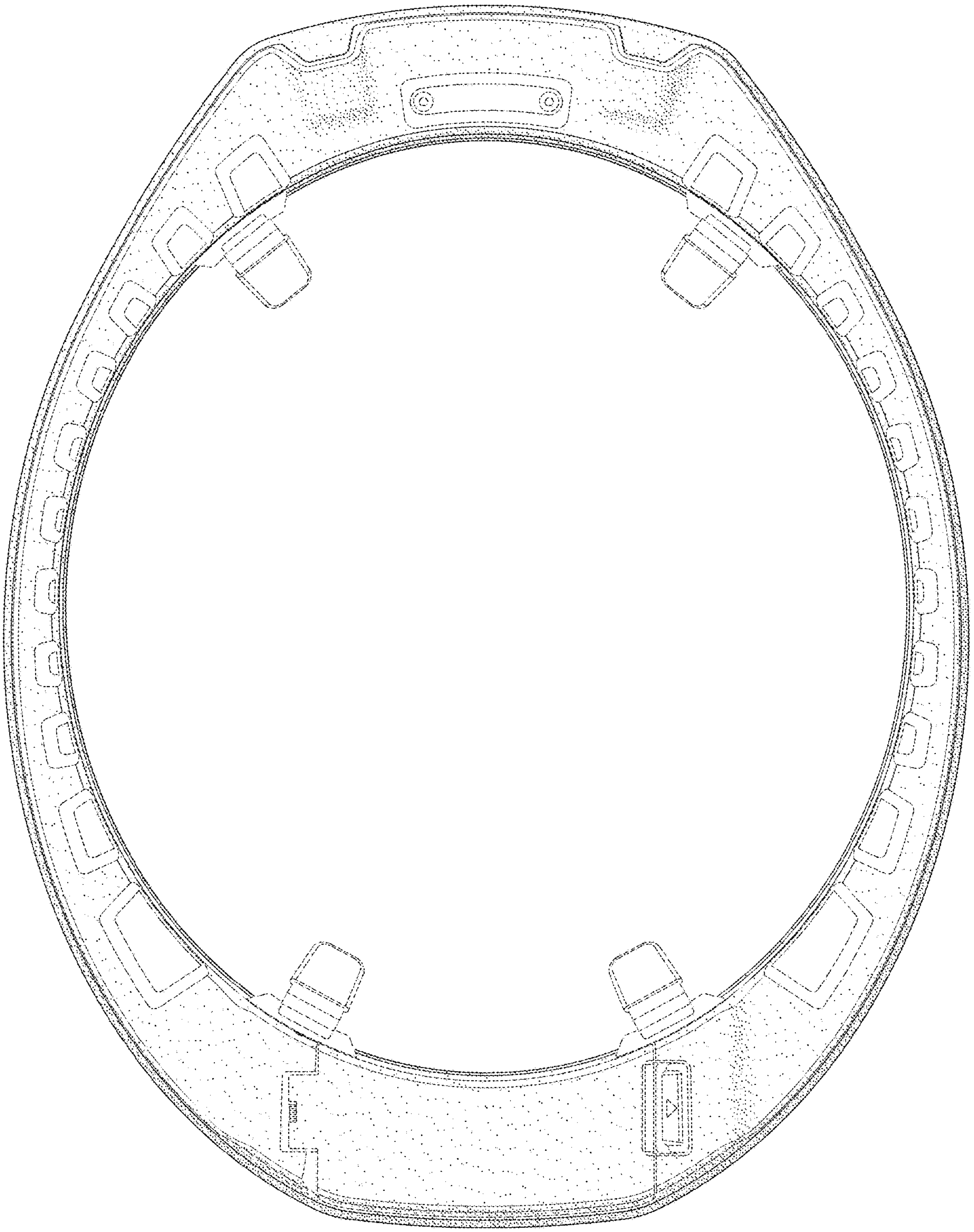
Figure 15:
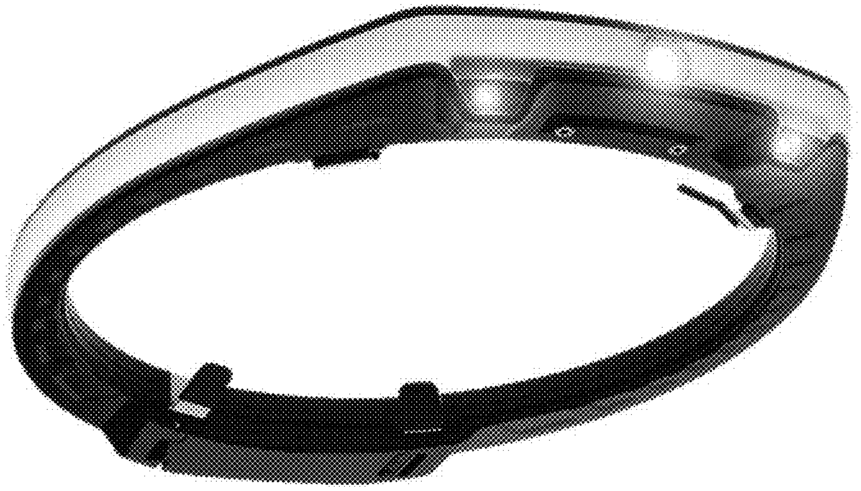
FIGS. 15 and 16 provide renderings of another embodiment of a light-emitting system similar to the light-emitting system of FIG. 5.
Figure 16:

FIGS. 4A-4B depict an exemplary method 400 of operation of a CSS system, such as may be performed by one or more modules of the CSS system 110 of the networked environment 100 depicted by FIG. 1, and/or the CSS system 340 executed by the server computing system 300 of FIG. 3.

The method 400 starts at 404, in which a processor-based device receives information or a request, such as from a device or user associated with the CSS system. At 406, the processor-based device determines whether the information or request is from a base station (such as one of the gateway base stations 150 of FIG. 1, or gateway base stations 380 of FIG. 3). If it is determined that the received information or request is from a base station, at 408 the processor-based device determines whether the received information or request includes event data from a halo signaling device. If so, at 410 the processor-based device determines whether the event satisfies one or more predefined alert criteria. If so, at 414 the processor-based device transmits an alert notification to the appropriate devices according to the satisfied alert criteria. Otherwise, at 416 the processor-based device updates tracking information associated with the received event data.

If at 408 it was determined that the received information or request was not event data from a halo signaling device, at 412 the processor-based device determines whether the received information or request includes position data from a halo signaling device or proximity beacon. If so, at 418 the processor-based device updates the tracking information for the halo signaling device or proximity beacon associated with the received position data. Optionally, the processor-based device may also determine to update one or more displays based on the updated tracking information (e.g., if the location of the associated device is currently indicated on one or more site management computing systems or graphical user interface of the CSS system, such as map display area 230 of FIGS. 2C and 2D). If it is determined that the information or request received from the base station is not device position data, at 420 the processor-based device performs one or more other operations as appropriate.

If at 406 it was determined that the received information or request was not from a base station, at 428 (with reference to FIG. 4B) the processor-based device determines whether the received information or request is from an authorized user. If not, at 430 the processor-based device may simply perform another operation is appropriate, such as ignoring the received information or generating an error message. If the received information or request is determined to be from an authorized user, at 432 the processor-based device determines whether the received information is configuration information. At 434, the processor-based device determines whether the received configuration information includes lighting scheme configuration data. If so, at 436 the processor-based device stores the defined lighting scheme for future use.

If it was determined at 434 that the received configuration information was not a lighting scheme configuration, at 438 the processor-based device determines whether the received information defines event or location criteria. If so, then at

440 the processor-based device stores the defined event or location criteria for future use. Otherwise, at 442 the processor-based device determines whether the received configuration information includes association information, such as an indication of a particular lighting scheme to be triggered at the occurrence of a defined event. If so, at 444 the processor-based device optionally transmits a lighting scheme instruction to appropriate associated halo signaling devices according to the newly received criteria; otherwise, at 446 the processor-based device may perform other operations as appropriate based on the received information.

If it was determined at 432 that the received information or request is not configuration information, at 448 the processor-based device determines whether the incoming request is for location data associated with one or more halo signaling devices or proximity beacons. If so, at 452 the processor-based device provides the requested location data for the indicated devices, and at 454 optionally transmits instructions to the indicated devices to cause those devices to emit an appropriate lighting scheme, such as via one or more base stations associated with and/or proximate to the indicated devices. If at 448 it was determined that the received request was for non-location information related to one or more halo signaling devices (or proximity beacons), at 456 the processor-based device provides the requested information (such as to one or more site management computing systems associated with the CSS system).

After 414, 416, 418, 420, 430, 436, 440, 444, 446 or 454, control passes to (with reference to FIG. 4A) 422 to optionally perform any other actions as appropriate, such as any housekeeping tasks. In block 495, the processor-based device determines whether to continue, such as in response to an explicit indication to terminate. If it is to continue, control returns to block 404 to await additional information or requests, and if not proceeds to step 499 and ends.

It will be appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures or by having multiple data structures consolidated into a single data structure. Similarly, in some implementations illustrated data structures may store more or less information than is described, such as when other illustrated data structures instead lack or include such information respectively, or when the amount or types of information that is stored is altered.

According to at least one implementation, a site safety system may be summarized as including a plurality of signaling devices; a configurable site safety server having one or more processors that is communicatively coupled to the plurality of signaling devices; and at least one memory, the memory including instructions that, upon execution by at least one of the one or more processors, cause the configurable site safety server to: track location information received from each of the plurality of signaling devices; and cause, based at least in part on a subset of the plurality of signaling devices satisfying one or more defined criteria, a lighting array of each of the subset of signaling devices to display a defined lighting scheme.

The instructions may further cause the configurable site safety server to provide one or more notifications to a client computing device associated with one or more users based at least in part on the tracked location information. The one or more notifications may include an alert based at least in part on one of the signaling devices entering or departing from a defined site location for the at least one signaling device. The one or more notifications may include an alert based at least in part on one of the signaling devices entering or departing from a defined geographical hazard zone. The one or more notifications may include an alert based at least in part on one of the signaling devices remaining substantially stationary for a defined duration.

At least one of the signaling devices may include an accelerometer, and wherein the instructions may further cause the configurable site safety server to provide one or more notifications based at least in part on accelerometer data received from the at least one signaling device.

At least one of the signaling devices may include an audio alert capability, and wherein the instructions may further cause the configurable site safety server to provide one or more audio alerts to the at least one signaling device. Each of at least some of the signaling devices may be removably coupled to an item of equipment wearable by a human user. The item of equipment may include substantially rigid headwear.

Each of at least one of the signaling devices may be uniquely associated with a respective human user, and wherein the at least one signaling device may be further communicatively coupled to a mobile client device associated with the respective human user. Multiple of the signaling devices may be communicatively coupled to one another. The defined lighting scheme may include one or more color combinations associated with the subset of signaling devices and not associated with other signaling devices of the plurality. The defined lighting scheme may include one or more animated lighting patterns. Each of the subset of signaling devices may be associated with a respective human user, and wherein the one or more defined criteria may include a level of experience of the respective human user associated with each signaling device of the subset. Each of the subset of signaling devices may be associated with a respective human user, and wherein the one or more defined criteria may include an assigned role of the respective human user associated with each signaling device of the subset. The one or more defined criteria may include a degree of proximity of the signaling devices of the subset to one or more other signaling devices of the plurality. The one or more other signaling devices of the plurality may include a proximity beacon associated with a vehicle, such that causing a lighting array of each of the subset of signaling devices to display a defined lighting scheme may include causing a visual alert to be displayed by signaling devices that are within a defined degree of proximity to the vehicle. The one or more other signaling devices of the plurality may include a proximity beacon associated with a vehicle, such that causing a lighting array of each of the subset of signaling devices to display a defined lighting scheme may include causing a visual alert to be displayed by signaling devices that are within a defined degree of proximity to a path indicated by a directional heading of the vehicle. The one or more defined criteria may include the occurrence of one or more defined events.

The instructions may further cause the configurable site safety server to, based at least in part on the tracked location information, cause at least a portion of a user interface of a client computing device to display an indication of a current location of each of at least some of the plurality of signaling devices. The instructions may further cause the configurable site safety server to select the subset of the plurality of signaling devices based on the one or more defined criteria.

The instructions may further cause the configurable site safety server to receive configuration information from a client computing device associated with a user, and wherein the received configuration information may specify one or more of a group that includes criteria for selecting one or more subsets of the plurality of signaling devices; one or more lighting schemes to respectively associate with subsets of the plurality of signaling devices; and an event to be associated with a defined lighting scheme. Receiving the configuration information from the client computing device may include receiving at least some of the configuration information via one or more interactions of the user with a graphical user interface of an application executing on the client computing device, wherein the executing application may be associated with the configurable site safety server.

The instructions may further cause the configurable site safety server to, based at least in part on the tracked location information, generate additional data associated with at least some of the plurality of signaling devices, wherein the additional data may include one or more of traffic routes taken by users associated with the at least some signaling devices; historical location data associated with the at least some signaling devices; and inventory management data. The configurable site safety server may be remotely located from a geographical location of the plurality of signaling devices, and wherein the plurality of signaling devices may be communicatively coupled to the configurable site safety server via one or more base station devices that are proximate to the geographical location and that are distinct and separate from the plurality of signaling devices. At least one of the one or more base station devices may store at least some of the location information received from each of at least some of the plurality of signaling devices at a first time, and wherein the at least one base station device may provide the stored location information to the configurable site safety server at a second time that is later than the first time.

The configurable site safety server may be further associated with a distinct second plurality of signaling devices located at a distinct second geographical location, and wherein the instructions may further cause the configurable site safety server to track additional location information received from each of the distinct second plurality of signaling devices.

According to at least one implementation, a computer-implemented method may be summarized as including receiving, by one or more computing servers configured as at least part of a configurable site safety system, location tracking information from each of a plurality of signaling devices; causing, by the one or more configured computing servers and in response to the received location tracking information, at least a portion of a user interface of a client computing device to display a visual indication of a current location of each of at least some of the plurality of signaling devices; receiving site configuration information associated with a geographical location; and transmitting, by the one or more configured computing servers and based on the received site configuration information, one or more control signals to at least a subset of the plurality of signaling devices, the transmitted control signals causing a lighting array of each of the subset of signaling devices to display a defined lighting scheme in accordance with the received configuration information.

The computer-implemented method may further include providing one or more notifications to a client computing device associated with one or more users based at least in part on the tracked location information.

At least one of the signaling devices may include an accelerometer, and wherein the method may further include providing, by the one or more configured computing servers, one or more notifications based at least in part on accelerometer data received from the at least one signaling device. Causing the lighting array of each of the subset of signaling devices to display a defined lighting scheme may include causing the lighting array of each of the subset to display one or more color combinations that may be associated with the subset of signaling devices and not associated with other signaling devices of the plurality. Causing the lighting array of each of the subset of signaling devices to display a defined lighting scheme may include causing the lighting array of each of the subset to display one or more animated lighting patterns.

The computer-implemented method may further include selecting the subset of signaling devices based at least in part on a the signaling devices of the subset being located within a defined degree of proximity to one or more other signaling devices of the plurality.

The computer-implemented method may further include selecting the subset of signaling devices based at least in part on the occurrence of one or more defined events. Receiving the site configuration information may include receiving at least some of the site configuration information via one or more interactions of a user with a graphical user interface of the client computing device. Receiving the location tracking information may include receiving at least some of the location tracking information via one or more base station devices that are proximate to the current location of the at least some signaling devices.

According to at least one implementation, a signaling device operable to be removably interfaced with human-wearable equipment may be summarized as including a controller; a lighting array that includes a plurality of individually addressable light emitters; a global positioning interface; one or more wireless communication interfaces; wherein, in operation, the controller: provides, to a server via at least one of the one or more wireless communication interfaces, positioning data received via the global positioning interface; receives, based at least in part on the provided positioning data, one or more control signals from the server via the one or more wireless communication interfaces; and in response to the one or more control signals, causes the lighting array to display a defined lighting scheme. The controller, in operation, may receive configuration data regarding the defined lighting scheme from a client computing device via the one or more wireless communication interfaces.

Those skilled in the art will appreciate that the routines and data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

FIGS. 5-14 illustrate one example embodiment of a signaling device that may be used in connection with aspects of the CSS systems described herein. The signaling device may be provided in the form of a light-emitting system (1000) removably attachable to headgear and may be summarized as including: a form factor (1010) configured to surround a portion of the headgear when the light-emitting system (1000) is removably attached to the headgear for use; a plurality of halo lighting elements (1100) configured to selectively generate at least a partial halo of light that radiates outwardly away from the light-emitting system; and at least one task lighting element (1120) aligned in a direction along a task light axis (1130) that is fixed and oriented downwardly at an oblique angle (α) relative to a transverse plane (TP) of the light-emitting system (1000), the at least one task lighting element (1120) being configured to selectively generate flood task lighting in an area in front of a user.

The form factor may comprise a housing (1020) with at least one lens (1060). The at least one lens (1060) of the housing (1020) may include a downwardly extending projection (1220) to overlie the at least one task lighting element (1120). At least some of the plurality of halo lighting elements (1100) may be supported by the housing (1020) and fixed in a stationary manner relative to the housing (1020) and the at least one task lighting element (1120). The light-emitting system (1000) may comprise a pair of task lighting elements (1120), each one of the pair of task lighting elements (1120) being provided on a respective one of opposing lateral sides of a sagittal plane (SP) of the light-emitting system (1000). At least one spot lighting element (1140) may be supported between the pair of task lighting elements (1120) and being configured to selectively generate spot lighting in the area in front of the user. The at least one spot lighting element (1140) may be aligned in a direction along a spot light axis (1150), and each of the pair of task lighting elements (1120) may be aligned along a respective task light axis (1120), and the spot light axis (1150) may be non-parallel to the task lighting axes (1130). The spot light axis (1150) may be oriented generally parallel with the transverse plane (TP) of the light-emitting system (1000), and each task light axis (1130) may be oriented downwardly at an oblique angle (α) relative to the transverse plane (TP). For example, each task light axis (1130) may be oriented downwardly at an oblique angle (α) of at least 20 degrees relative to the transverse plane (TP), or between 20 degrees and 60 degrees.

The at least one lens (1060) may include a pair of downwardly extending projections (1220) to overlie the pair of task lighting elements (1120). The downwardly extending projections (1220) may extend at an oblique angle (β) relative to the transverse plane (TP) of the light-emitting system (1000) toward a central axis (A) of the light-emitting system (1000). At least some of the plurality of halo lighting elements (1100) may be supported in an anterior region of the light-emitting system between the pair of task lighting elements (1120). The at least one lens (1060) may have a base portion (1200) that overlies at least some of the plurality of halo lighting elements (1100), and the downwardly extending projections (1220) may extend from the base portion (1200) in the anterior region of the light-emitting system (1000). The housing (1020) of the light-emitting system (1000) may comprise a singular, at least partially annular lens (1060) that overlies at least some of the plurality of halo lighting elements (1100) and the pair of task lighting elements (1120).

The light-emitting system (1000) may further include an attachment mechanism (1040) attached to the housing (1020) for removably securing the light-emitting system (1000) to the headgear (e.g., hardhat) to without compromising the integrity of the headwear. The attachment mechanism may include, for example, a plurality of flexible spring clips that apply a bias against the headwear (e.g., hardhat) to hold the light-emitting system (1000) in place. As another example, the attachment mechanism may be provided in the form of an elastic band structure or adjustable band structure that is coupled to the housing or housings.

The at least one task lighting element (1120) may be selectively illuminable independently of the plurality of halo lighting elements (1100). When provided, the at least one spot lighting element (1140) may be selectively illuminable independently of the at least one task lighting element (1120) and the plurality of halo lighting elements (1100). The light-emitting system may further include a first touch control element (1300) associated with the plurality of halo lighting elements (1100) for controlling an illumination state of the halo lighting elements (1100), and a second touch control element (1320) associated with the at least one spot lighting element (1140) and the at least one task lighting element (1120) for controlling illumination states of the at least one spot lighting element (1140) and the at least one task lighting element (1160). A luminous flux of the at least one spot lighting element (1140) may be greater than a luminous flux of the at least one task lighting element (1160). A beam angle of the at least one spot lighting element (1140) may be smaller than a beam angle of the at least one task lighting element (1160).

Figure 17:
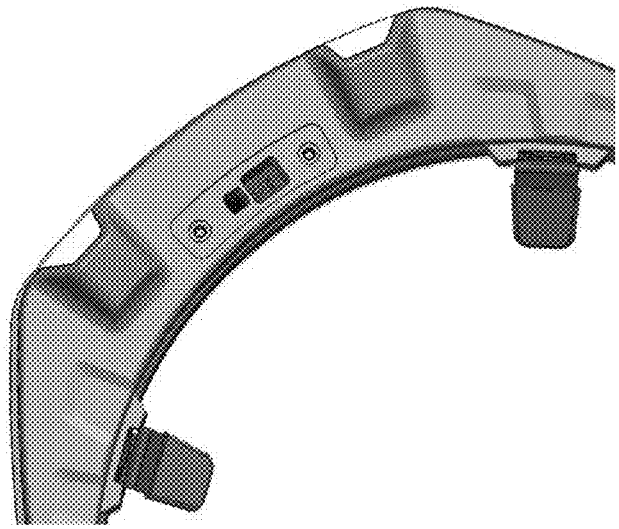
FIGS. 17 and 18 show enlarged portions of the example embodiment of the light-emitting system of FIG. 5 with a cover element removed to reveal and an access port to electrical interfaces of a control system of the light-emitting system.
Figure 18:
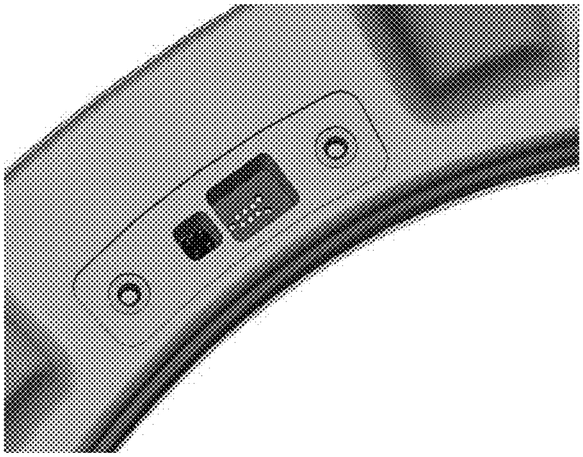

The housing (1020) may be provided with an access port (1500) for selectively accessing a control system (1400) located within the housing (1020). The access port (1600) may overlie one or more electrical interfaces (1500) of the control system (1400). The electrical interface(s) (1500) may be communicatively coupled to hardware of the control system (1400) to enable revisions to firmware stored on the hardware. The electrical interface(s) (1500) may be communicatively coupled to hardware of the control system (1400) to enable an accessory device (1800) to electrically connect to the control system (1400) and/or to be powered by a power source of the control system (1400). A cover element (1620) may be removably secured to a base portion of the housing (1020) over the access port (1600) via a mechanical interface (1640) (e.g., arrangement of threaded inserts). The access port (1600) and electrical interface(s) (1500) can be seen more clearly in the enlarged portions of the light-emitting system (1000) shown in FIGS. 17 and 18.

Removing the cover element (1620) to reveal the access port (1600) may allow access to electrical interfaces (1500) in the form of: (i) programming pads for updating firmware of the onboard control system (1400); and (ii) a multi-pin expansion header for connecting the aforementioned accessory devices (1800) to the onboard control system (1400). The programming pads may be designed to mate with a Tag Connect TC2030-IDC connector or the like, and new firmware may be loaded on to the control system (1400) using an Atmel AVR ISP programmer or the like. The multi-pin expansion header may be, for example, a 2×2 pin header in which two pins are configured to provide battery power to the accessory devices (1800), and in which the other two pins may provide a logic-level UART for communication to a processor on a PCBA of the control system (1400). Accessory devices (1800) may mount via the mechanical interface (1640) (e.g., threaded inserts or other fasteners) located on either side of the electrical interfaces (1500).

The accessory device (1800) may be interchangeably attachable to the mechanical interface (1640) to enhance functionality of the light-emitting system (1000), including functionality associated with the CSS systems described herein. As examples, the accessory device (1800) may comprise one of the following: a supplemental lighting unit; a sensor unit; a wireless communications module; and a tracking module. The accessory device (1800) may be a supplemental lighting unit comprising one or more supplemental lighting elements that are selectively illuminable by the user. The accessory device (1800) may be a sensor unit comprising one or more sensors to obtain data from which to enhance functionality of the light-emitting system (1000). For example, the one or more sensors may be arranged to obtain biometric, environmental, location, motion, impact and/or other data from which to provide enhanced functionalities. The accessory device (1800) may be a communications module that interfaces with the control system (1400) to provide wireless communication between the light-emitting system and a remote computing device. The accessory device (1800) is a tracking module configured to provide position data of the light-emitting system or user for tracking or other purposes.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form.

What is claimed is:

1. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user; and at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user, wherein the at least one lens of the housing includes a downwardly extending projection to overlie the at least one task lighting element.

2. The light-emitting system of claim 1, wherein at least some of the plurality of primary lighting elements are supported by the housing and fixed in a stationary manner relative to the housing and the at least one task lighting element.

3. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user; and at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user, wherein the light-emitting system comprises a pair of task lighting elements, each one of the pair of task lighting elements being provided on a respective one of opposing lateral sides of a sagittal plane of the light-emitting system.

4. The light-emitting system of claim 1, further comprising:

at least one spot lighting element configured to selectively generate spot lighting in a spot light area in front of the user.

5. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user;

at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user; and at least one spot lighting element configured to selectively generate spot lighting in a spot light area in front of the user, wherein the at least one spot lighting element is aligned in a direction along a spot light axis, and wherein the spot light axis is non-parallel to the task lighting axis.

6. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user;

at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user; and at least one spot lighting element configured to selectively generate spot lighting in a spot light area in front of the user, wherein a luminous flux of the at least one spot lighting element is greater than a luminous flux of the at least one task lighting element.

7. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user;

at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user; and at least one spot lighting element configured to selectively generate spot lighting in a spot light area in front of the user, wherein a beam angle of the at least one spot lighting element is smaller than a beam angle of the at least one task lighting element.

8. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user; and at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user, wherein the task light axis is oriented downwardly at an oblique angle of at least 20 degrees relative to the transverse plane.

9. The light-emitting system of claim 1, further comprising:

an attachment mechanism attached to the housing for removably securing the light-emitting system to the headgear without compromising the integrity of the headgear.

10. The light-emitting system of claim 1 wherein the at least one task lighting element is selectively illuminable independently of the plurality of primary lighting elements.

11. The light-emitting system of claim 10, further comprising:

at least one spot lighting element which is selectively illuminable independently of the at least one task lighting element and the plurality of primary lighting elements.

12. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user;

at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user, and the at least one task lighting element being selectively illuminable independently of the plurality of primary lighting elements;

at least one spot lighting element which is selectively illuminable independently of the at least one task lighting element and the plurality of primary lighting elements;

a first touch control element associated with the plurality of primary lighting elements for controlling an illumination state of the primary lighting elements; and a second touch control element associated with the at least one spot lighting element and the at least one task lighting element for controlling illumination states of the at least one spot lighting element and the at least one task lighting element.

13. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user; and at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user, wherein the housing is provided with an access port for selectively accessing a control system located within the housing.

14. The light-emitting system of claim 13, wherein the access port overlies an electrical interface of the control system.

15. The light-emitting system of claim 14, wherein the electrical interface is communicatively coupled to hardware of the control system to enable revisions to firmware stored on the hardware.

16. The light-emitting system of claim 14, wherein the electrical interface is communicatively coupled to hardware of the control system to enable an accessory device to electrically connect to the control system and/or to be powered by a power source of the control system.

17. The light-emitting system of claim 13, wherein a cover element is removably secured to a base portion of the housing over the access port via a mechanical interface.

18. A light-emitting system removably attachable to headgear, the light-emitting system comprising:

a form factor configured to be positioned adjacent a portion of the headgear when the light-emitting system is removably attached to the headgear for use, the form factor comprising a housing with at least one lens;

a plurality of primary lighting elements configured to selectively generate light that radiates outwardly away from the light-emitting system to provide general illumination of the user and an environment around the user, including in at least a forward region in front of the user and a rearward region aft of the user;

at least one task lighting element aligned in a direction along a task light axis that is fixed and oriented downwardly at an oblique angle relative to a transverse plane of the light-emitting system, the at least one task lighting element being configured to selectively generate flood task lighting in a task area in front of the user; and an accessory device interchangeably attachable to the housing to enhance functionality of the light-emitting system.

19. The light-emitting system of claim 18, wherein the accessory device comprises one of the following:

a supplemental lighting unit comprising one or more supplemental lighting elements that are selectively illuminable by the user;

a sensor unit comprising one or more sensors to obtain data from which to enhance functionality of the light-emitting system, the one or more sensors being arranged to obtain biometric, environmental, location, motion, impact and/or other data;

a wireless communications module that interfaces with a control system of the light-emitting system to provide wireless communication between the light-emitting system and a remote computing device; and a tracking module that is configured to provide position data of the light-emitting system or user for tracking or other purposes.

* * * * *